(12) United States Patent
Peluso et al.

(10) Patent No.: US 12,142,407 B2
(45) Date of Patent: Nov. 12, 2024

(54) INDUCTOR DEVICES AND STACKED POWER SUPPLY TOPOLOGIES

(71) Applicant: Infineon Technologies Austria AG, Villach (AT)

(72) Inventors: Luca Peluso, Villach (AT); Gerald Deboy, Klagenfurt (AT); Matthias J. Kasper, Villach (AT); Kennith K. Leong, Villach (AT)

(73) Assignee: Infineon Technologies Austria AG, Villach (AT)

( * ) Notice: Subject to any disclaimer, the term of this patent is extended or adjusted under 35 U.S.C. 154(b) by 625 days.

(21) Appl. No.: 17/186,339

(22) Filed: Feb. 26, 2021

(65) Prior Publication Data

US 2022/0276685 A1 Sep. 1, 2022

(51) Int. Cl.
| | | |
|---|---|---|
| *H01F 17/06* | (2006.01) | |
| *H01F 17/04* | (2006.01) | |
| *H01F 21/12* | (2006.01) | |
| *H01F 27/24* | (2006.01) | |
| *H01F 17/00* | (2006.01) | |

(52) U.S. Cl.
CPC ........... *H01F 21/12* (2013.01); *H01F 17/045* (2013.01); *H01F 2017/008* (2013.01)

(58) Field of Classification Search
CPC .................. H01F 21/12; H01F 17/045; H01F 2017/008; H01F 17/06; H01F 2003/106; H01F 3/10; H01F 27/24; H01F 41/0206; G06F 1/26; H02M 1/00; H05K 1/18; H05K 3/30
See application file for complete search history.

(56) References Cited

U.S. PATENT DOCUMENTS

| | | | | |
|---|---|---|---|---|
| 3,451,023 A | * | 6/1969 | Bull ...................... | H01F 29/146 336/212 |
| 2015/0070124 A1 | * | 3/2015 | Kapoor .................... | H01F 3/00 336/211 |
| 2021/0118604 A1 | * | 4/2021 | Kasper .................... | H01F 27/40 |

FOREIGN PATENT DOCUMENTS

| | | | | | |
|---|---|---|---|---|---|
| EP | 3809427 A1 | * | 4/2021 | ............ | H01F 17/06 |
| JP | 6860716 B1 | * | 4/2021 | | |

* cited by examiner

*Primary Examiner* — Tuyen T Nguyen
(74) *Attorney, Agent, or Firm* — Armis IP Law, LLC

(57) ABSTRACT

According to one configuration, an inductor device includes a core fabricated from multiple different types of magnetically permeable material. The inductor device includes an electrically conductive path extending through the core. A magnetic permeability of the core varies in magnitude depending on a distance with respect to the electrically conductive path.

14 Claims, 21 Drawing Sheets

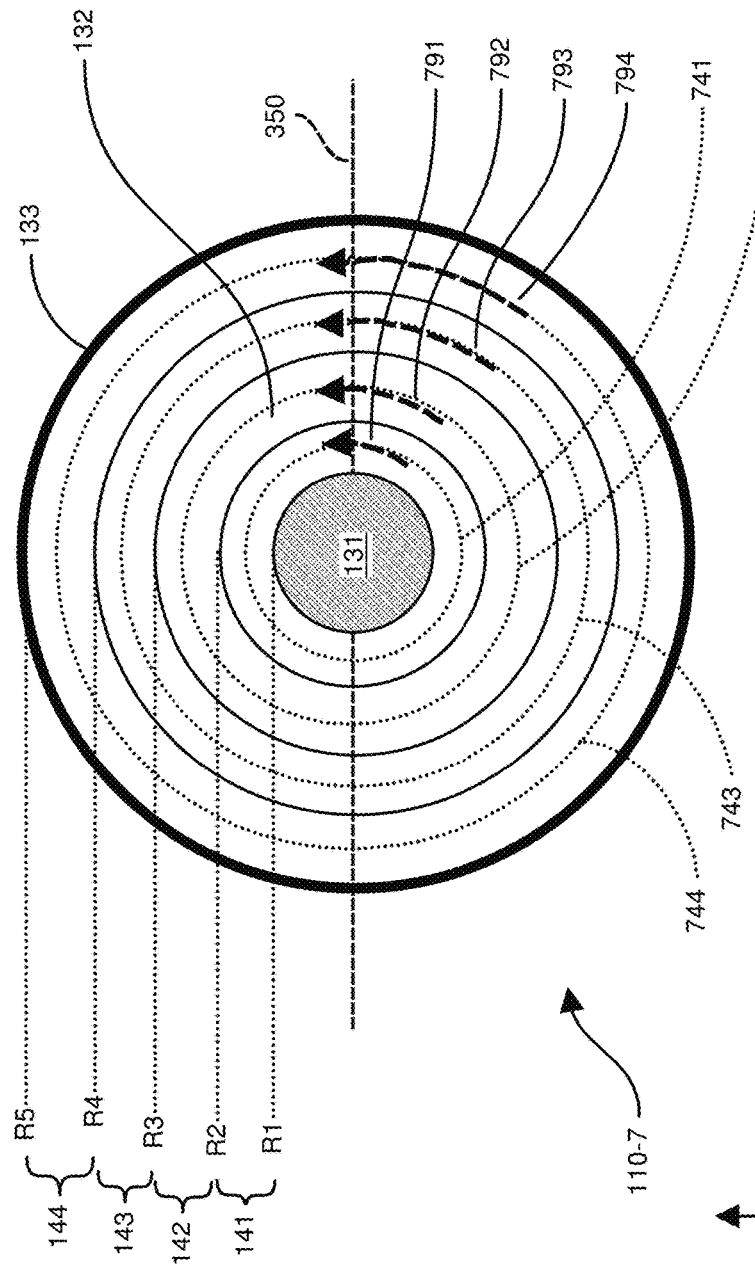
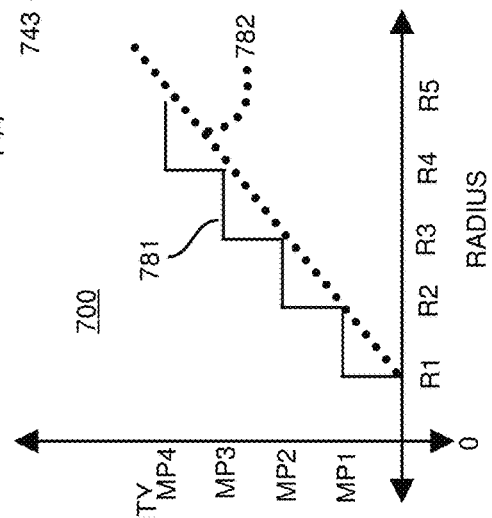
FIG. 7A
FIG. 7B

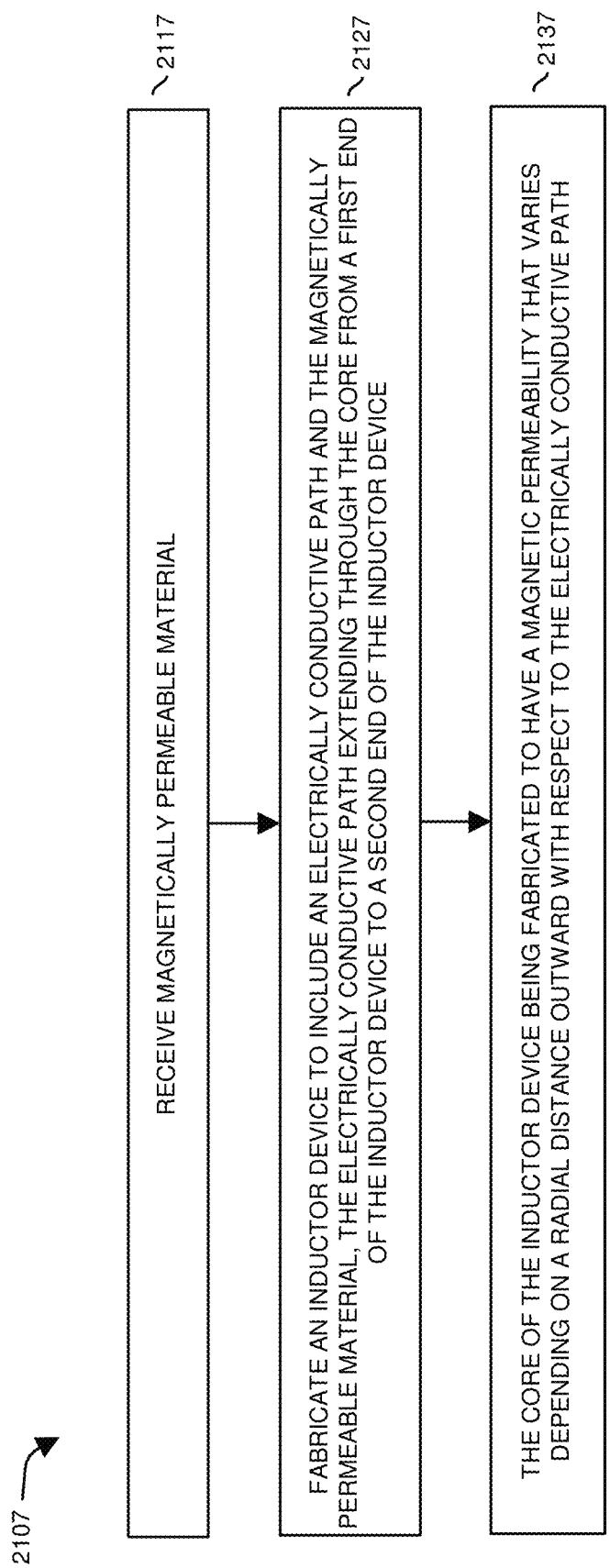

INDUCTOR DEVICES AND STACKED POWER SUPPLY TOPOLOGIES

BACKGROUND

Conventional switching power supply circuits sometimes include an energy storage component such as an inductor to produce an output voltage that powers a load. For example, to maintain a magnitude of an output voltage within a desired range, a controller controls switching of input current through one or more inductors.

In general, a conventional inductor is a component comprising wire or other conductive material, which is shaped as a coil or helix to increase an amount of magnetic flux through a respective circuit path. Winding of a wire into a coil of multiple turns increases the number of respective magnetic flux lines in a respective inductor component, increasing the magnetic field and thus overall inductance of the respective inductor component.

BRIEF DESCRIPTION

Implementation of clean energy (or green technology) is very important to reduce our impact as humans on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. In certain instances, energy is stored in a respective one or more battery resource. Regardless of whether energy is received from green energy sources or non-green energy sources, it is desirable to make most efficient use of raw energy (such as storage and subsequent distribution) provided by such systems to reduce our impact on the environment. This disclosure contributes to reducing our carbon footprint and better use of energy via more efficient energy conversion.

For example, this disclosure includes the observation that conventional inductor components (such as used to support power conversion) are suited for planar circuit applications in which a respective planar surface of a power supply circuit board is populated with multiple different components that are, in turn, coupled to each other via circuit traces disposed on the planar surface. Such topologies (providing horizontal power flow in the power supply circuit board) inevitably make it difficult to create a compact, efficient, and high current output power supply circuit.

In contrast to conventional techniques, embodiments herein provide novel and improved inductor components for use in applications such as power conversion. For example, embodiments herein include novel inductor devices, corresponding use, methods fabricating same, etc.

More specifically, embodiments herein include novel inductor device comprising a core fabricated from multiple different types of magnetically permeable material. The inductor device includes an electrically conductive path extending through the core of the inductor device. A magnetic permeability of the core (surrounding the conductive path) varies in magnitude depending on a distance with respect to the electrically conductive path.

In accordance with further example embodiments, the magnetic permeability of the core varies as a function of a radial distance from the electrically conductive path.

In yet further example embodiments, the magnetic permeability of magnetically permeable material in the core increases in magnitude as the radial distance from the electrically conductive path increases.

In still further example embodiments, the core includes multiple concentric layers of material with respect to the electrically conductive path. The multiple concentric layers of magnetically permeable material include a first concentric layer of material (at a first radius with respect to the electrically conductive path) and a second concentric layer of material (at a second radius with respect to the electrically conductive path). The second concentric layer of material (such as outer layer with respect to the electrically conductive path) has a higher magnitude of magnetic permeability than the first concentric layer of material. In one embodiment, the first concentric layer of material is disposed between the electrically conductive path and the second concentric layer of material.

In further example embodiments, the core of the inductor device as discussed herein confines magnetic flux generated from current flowing through the electrically conductive path. The magnitude of the magnetic permeability of the magnetically permeable material can be any suitable one or more values. In one non-limiting example embodiment, the magnetic permeability of the magnetically permeable material in the core of the inductor device is between 30 and 150 Henries/meter, although it can be any suitable value.

In accordance with another example embodiment, a change in the magnetic permeability in the core as a function of the distance from the electrically conductive path is substantially linear. For example, in one embodiment, the variable permeability of the magnetically permeable material in the core of the inductor device results in a substantially same magnetic density of magnetic flux throughout the magnetically permeable material based on a respective flow of current throughout the electrically conductive path producing the magnetic flux.

In further example embodiments, the magnetically permeable material in the core of the inductor device includes first magnetically permeable material and second magnetically permeable material. The first magnetically permeable material is fabricated as one or more fins extending radially outward from the electrically conductive path. The second magnetically permeable material fills in gaps (such as wedges, filler, etc.) of the inductor device between the fins.

In still further example embodiments, a cross section of the inductor device viewed along an axis of the electrically conductive path includes wedges of the second magnetically permeable material disposed between portions (such as fins) of the first magnetically permeable material. The second magnetically permeable material has a higher magnetic permeability than the first magnetically permeable material.

In yet further example embodiments, a first radius about an axis of the electrically conductive path intersects first magnetically permeable material (such as fins) and second magnetically permeable material (such as wedges in between the fins) in the core at different angular positions; the second magnetically permeable material has a higher magnetic permeability than the first magnetically permeable material.

In one embodiment, the inductor device includes a first flux path at a first radius with respect to an axis of the electrically conductive path. The first flux path alternates between passing through first magnetically permeable material and second magnetically permeable material in the core. As previously discussed, the second magnetically permeable material has a higher magnetic permeability than the first magnetically permeable material. The inductor device further includes a second flux path at a second radius with respect to the axis of the electrically conductive path. The second radius is greater than the first radius. The second flux path alternates between passing through the first magnetically permeable material and the second magnetically permeable material in the core. The second flux path passes through a higher ratio of the second magnetically permeable material to the first magnetically permeable material than the first flux path. The ratio of flux passing through the second magnetically permeable material to passing through the first magnetically permeable material increases at greater radius values with respect to the circuit path.

The inductor device as described herein provides advantages and is useful over conventional inductor devices. For example, the inductor device as discussed herein is simple to fabricate and supports higher inductance values for a same sized conventional inductor component.

These and other more specific embodiments are disclosed in more detail below.

Note that any of the resources (such as a fabricator) implemented in the system as discussed herein can include one or more computerized devices, fabrication equipment, material handlers, controllers, mobile communication devices, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a fabricator such as including computer readable storage medium and/or system having instructions stored thereon to fabricate an inductor device. The instructions, when executed by computer processor hardware, cause the computer processor hardware (such as one or more co-located or disparately located processor devices or hardware) to: receive magnetically permeable material; fabricate an inductor device to include an electrically conductive path and the magnetically permeable material, the electrically conductive path extending through the core from a first end of the inductor device to a second end of the inductor device; and the core of the inductor device being fabricated to have a magnetic permeability that varies depending on a radial distance outward with respect to the electrically conductive path.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although embodiments as discussed herein are applicable to switching power supplies, the concepts disclosed herein may be advantageously applied to any other suitable topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 7A is an example diagram illustrating an inductor device including multiple concentric layers of different magnetically permeable material and flux paths through the layers carrying corresponding flux according to embodiments herein.

FIG. 7B is an example graph illustrating variation in the magnetic permeability of the core with respect to a distance from the electrically conductive path according to embodiments herein.

FIG. 21 is an example diagram illustrating a method according to embodiments herein.

Figure 1:
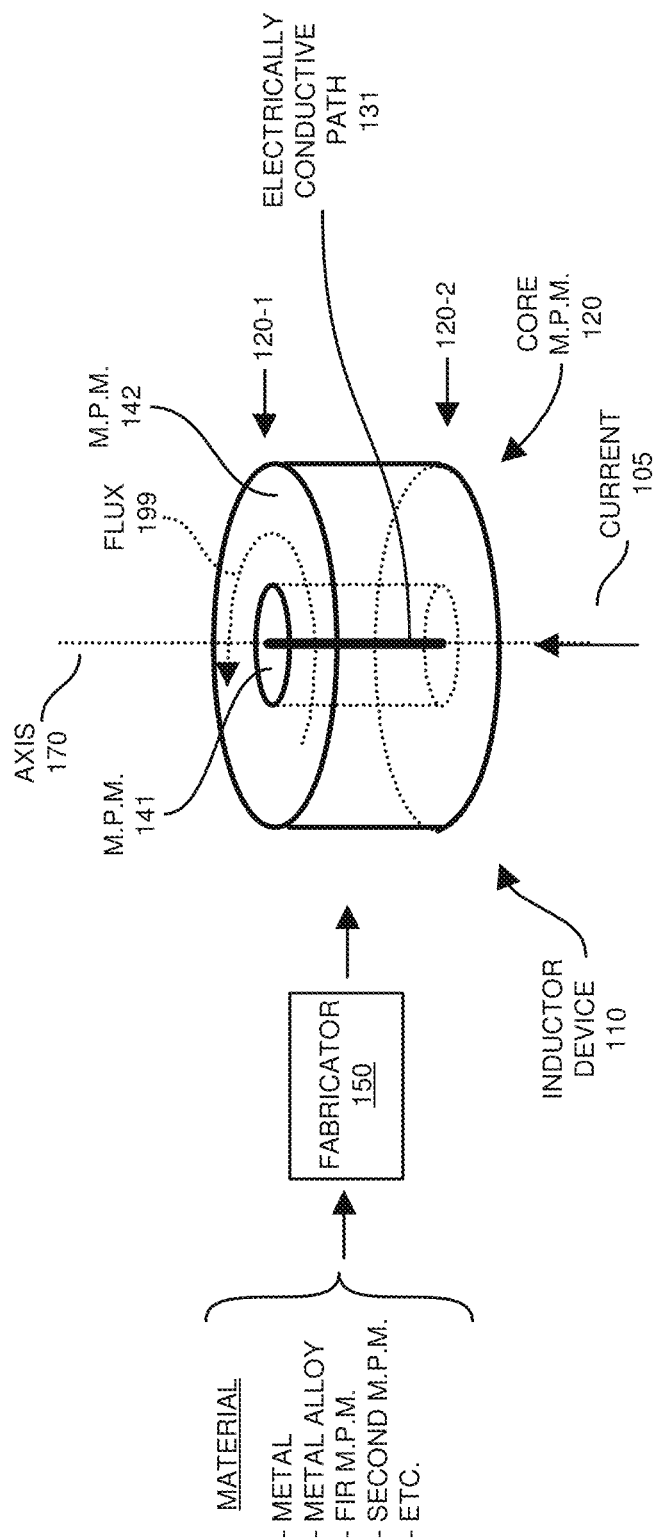
FIG. 1 is an example three-dimensional (see-through) view of an inductor device according to embodiments herein.

The foregoing and other objects, features, and advantages of embodiments herein will be apparent from the following more particular description herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Now, with reference to the drawings, FIG. 1 is an example three-dimensional (see-through) view of an inductor device according to embodiments herein.

In this example embodiment, the fabricator 150 receives materials such as metal (electrically conductive material), metal alloy, first magnetically permeable material, second magnetically permeable material. etc.

Based on the received material, the fabricator 150 fabricates the inductor device 110 to include an electrically conductive path 131 and core 120 comprising magnetically permeable material such as magnetically permeable material 141 and magnetically permeable material 142. The electrically conductive path 131 extends through the core 120 of the inductor device 110 from a first end 120-1 of the inductor device 110 to a second end 120-2 of the inductor device 110.

In one embodiment, as further discussed herein, the fabricator 150 fabricates the core 120 (material outside the electrically conductive path 131) of the inductor device 110 to have a magnetic permeability that varies depending on a radial distance outward with respect to the electrically conductive path 131.

More specifically, the inductor device 110 in FIG. 1 includes a core 120 such as magnetically permeable material 141 and magnetically permeable material 142. Electrically conductive path 131 disposed on axis 170 and extends between the first axial end 120-1 and second axial end 120-2 of the inductor device 110. Core material such as magnetically permeable material 141 envelops (surrounds) the electrically conductive path 131. Core material such as magnetically permeable material 142 envelops (surrounds) the magnetically permeable material 142. Core 120 includes any number of different layers of magnetically permeable material.

If desired, the electrically conductive path 131 is surrounded with a layer of insulative material (such as non-electrically conductive material so as not to come in contact with the core material 120). In other words, the electrically conductive path 131 is optionally coated with an insulation layer of material disposed between the electrically conductive path 131 and the magnetically permeable material 141.

Presence of the magnetically permeable material 141 and magnetically permeable material 142 transforms the electrically conductive path 131 into an inductive path (a.k.a., inductor device 110). For example, flow of current through the electrically conductive path 131 (inductive path) results in generation of respective magnetic flux 199 according to the right hand rule.

As its name suggests, the magnetically permeable material 141 and magnetically permeable material 142 surrounding the electrically conductive path 131 is magnetically permeable. The magnetically permeable material can be fabricated from any suitable matter. In one embodiment, by way of non-limiting example embodiment, the core material 120 has a flux permeability between 25-60 Henries/meter or any other suitable values.

In yet further embodiments, the fabricator 150 as described herein fabricates the inductor device 110 such that core material (two or more different magnetically permeable material such as magnetically permeable material 141, magnetically permeable material 142, etc.) through which the electrically conductive path 131 passes does not include any air gaps or voids that are not filled with magnetically permeable material.

Alternatively, note further that embodiments herein include inclusion of one or more air gaps in the core of the inductor device 110. For example, embodiments herein include fabricating the core region disposed outside (or external to) the electrically conductive path 131 to include any of one or more different types of magnetically permeable material as discussed herein as well as any number of one or more air gaps of any suitable dimensions.

In yet further embodiments, the electrically conductive path 131 is fabricated from any suitable conductive material such as metal, a metal alloy (combination of multiple different metals), etc.

Note further that the electrically conductive path 131 can be fabricated as any suitable shape such as rod-shaped, pillar-shaped, etc. In one embodiment, the electrically conductive paths is a non-winding circuit path extending through the inductor device 110 along axis 170. Note that the inductor device can be fabricated as being cylindrical or any other suitable shape.

Thus, embodiments herein include a novel inductor device 110 comprising a core 120 fabricated from two or more different types of magnetically permeable material such as magnetically permeable material 141, magnetically permeable material 142, etc.

The inductor device 110 includes an electrically conductive path 131 extending through the magnetic permeable core. As shown, and as further discussed herein, the magnetic permeability of the core 120 of inductor device 110 varies in magnitude depending on a distance with respect to the electrically conductive path 131.

For example, in one embodiment, the core of the inductor device 110 includes multiple concentric layers of material (such as magnetically permeable material 141 and magnetically permeable material 142) with respect to the electrically conductive path 131. The multiple concentric layers of material surrounding the electrically conductive path 131 include a first concentric layer of magnetically permeable material 141 and a second concentric layer of material 142. In one embodiment, the second concentric layer of magnetically permeable material 142 has a higher magnitude of magnetic permeability than the first concentric layer of magnetically permeable material 141. The first concentric layer of magnetically permeable material is disposed between the electrically conductive path 131 and the second concentric layer of magnetically permeable material 142.

In further example embodiments, the core of the inductor device 110 confines the magnetic flux 199 generated from current 105 flowing through the electrically conductive path 131 from the second end 120-2 to the first end 120-1 according to the right hand rule as previously discussed. Again, the magnitude of the magnetically permeable material 141 and 142 can be any suitable values. In one embodiment, the magnetic permeability of the magnetically permeable material in the core 120 of the inductor device varies between 30 and 150 Henries/meter, although the permeability of the materials 141 and 142 can be any suitable value.

Figure 2:
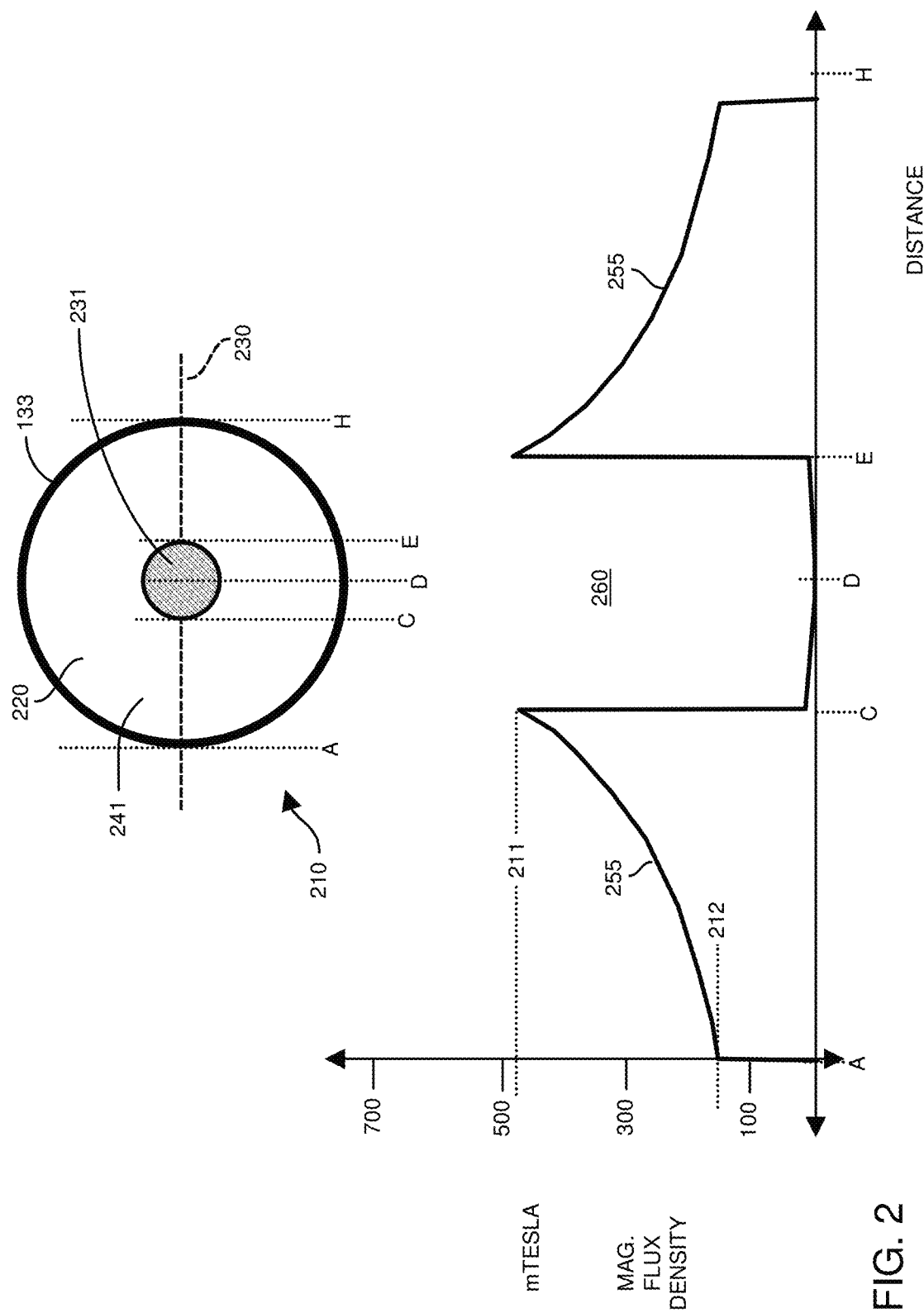
FIG. 2 is an example diagram illustrating a top (cutaway) view of an inductor device and corresponding magnetic flux density.

FIG. 2 is an example diagram illustrating a top (cutaway) view of a conventional inductor device and corresponding magnetic flux density.

As shown, the instance of inductor device 210 includes electrically conductive path 231 (such as fabricated from one or more metals) surrounded by homogeneous core 120 such as magnetically permeable material 241 (homogeneous material of a single magnetic permeability). The magnetic permeability of the inductor device 210 is the same between radius C and radius A because the inductor device 210 is fabricated from a single selected magnetically permeable material.

Note that next generation CPUs (e.g. advanced AI processors) for which vertical power flow voltage regulator modules (a.k.a., VRMs) are designed to support features such as fast load jump response and high current capabilities (up to 100 A per phase). In order to meet these requirements, it is desirable that the inductor devices have an inductance in the range of 20 nH (nano-Henries) to 60 nH and a high saturation flux density $B_{sat}$. Moreover, such inductor devices must be compact enough to comply with the typically tight dimensions requirements in order to fit in the small area, close or below the CPU, assigned to the VRM itself. Finally, due to the proximity to the CPU, in certain instances, it is good practice to avoid any air-gap in order to minimize or reduce EMI (Electro-Magnetic Interference).

The combination of desired inductance, rated current, available circuit board space, maximum dimensions, and absence of any air-gaps dictates the proper magnetic core material to employ in a respective inductor device as discussed herein. According to the aforementioned requirements, in one embodiment, one suitable class of materials suitable for this kind of application are the so called "soft-saturation" low-permeability materials (magnetically permeable material) typically comprise metal or alloy powders. These materials have an initial magnetic permeability $\mu_i$ in the range of 40 to 120 and a saturation flux $B_{sat}$>1 T.

Figure 3:
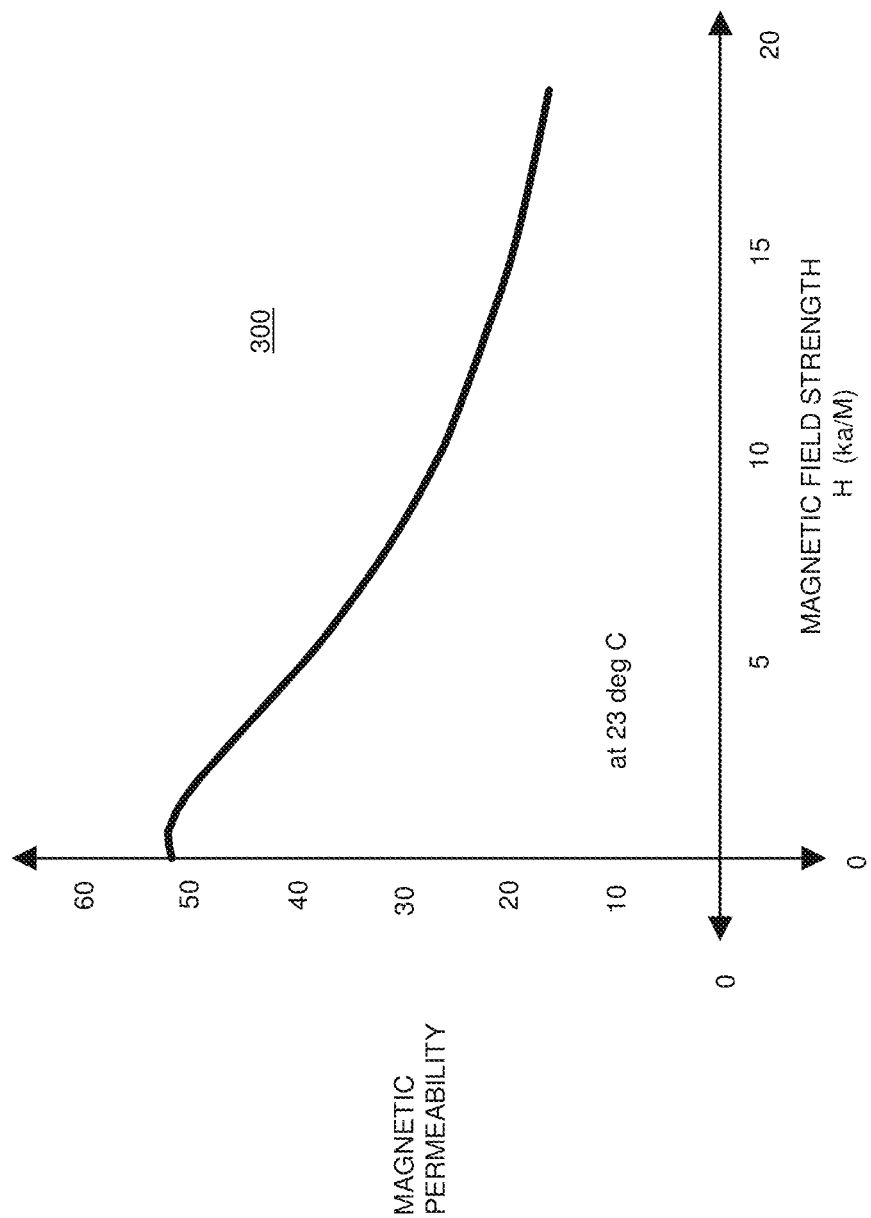
FIG. 3 is an example diagram illustrating magnetic permeability versus DC magnitude field.

One point of strength of such materials is their soft-saturation behavior which means that when the current is approaching the saturation level, the inductance value does not drop abruptly to 0 H, but it softly drops down according to the relative μ vs Hdc curve depicted for one of these materials, as an example in FIG. 3. More specifically, FIG. 3 illustrates that the permeability softly drops down when increasing the DC magnetic field, i.e., increasing the current.

Referring again to FIG. 2, in contrast to standard inductors, the magnetic flux density B in inductor device 210 is not constant over the cross-section of the core of the inductor device 210 between radius C and radius A. For example, the magnetic flux density in device 210 of FIG. 2 is radially distributed according to the well-known formula of the magnetic field generated by a current flowing into a vertical wire:

$$H = \frac{i}{2\pi r}$$

$$B = \mu_r \mu_0 H$$

where $\mu_r$, is the magnetic permeability of the material and $\mu_0$ is the permeability of the vacuum.

In this example, considering a desired maximum flux density $B_{max}$ of around 500 mT gives a certain permeability value (according to the corresponding dc magnetic field and the plot in FIG. 3). However, the magnetic flux density drops off quickly to <400 mT, which is not effectively used.

The reason why such area (volume between radius C and radius A) is not effectively used in the inductor device 210 having a homogeneous magnetic permeability as in FIG. 2 can be explained by looking at the following formula B=μ$_r$μ$_0$ H: having a certain core area with a flux density B lower than needed means that in such area the permeability of the material could be higher which would lead to a higher inductance value while keeping the same physical dimensions. In order words: selecting the permeability for the inductor device 110-1 based on the peak flux, which occurs only very close to the center (electrically conductive path 231), is not optimal for the outer part of the core such as the portion of the core magnetically permeable material 210 between radius B and radius A.

In order to enable a better core (magnetically permeable material 241) area utilization, embodiments herein (as discussed in subsequent FIGS. and corresponding descriptive text) include substantially equalizing the magnetic flux distribution over the entire core radius between radius C and radius A, or at least substantially flattening the magnetic flux density curve 255 in graph 260 as further discussed herein.

Figure 4:
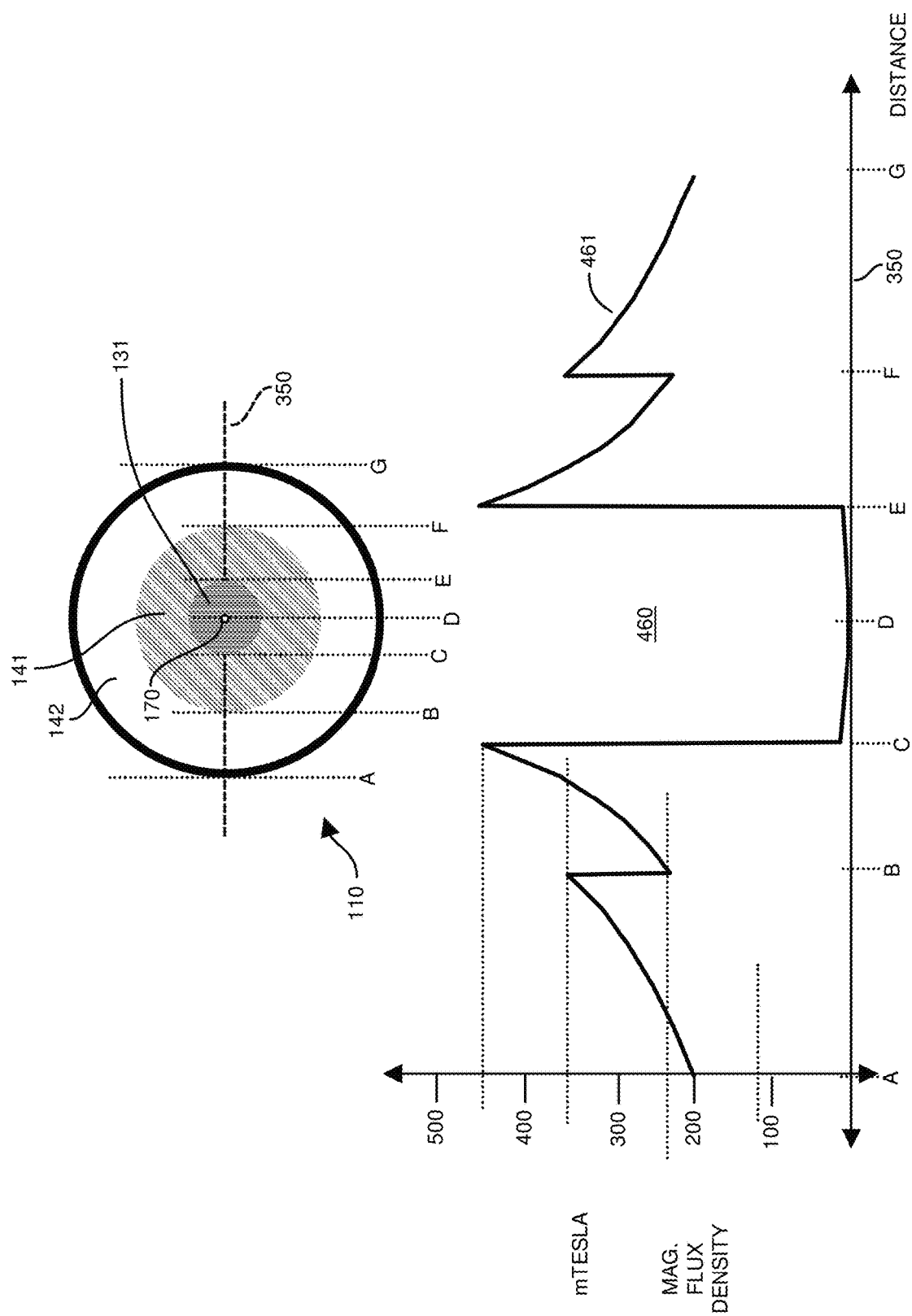
FIG. 4 is an example diagram illustrating a top (cutaway) view of an inductor device and variation in magnetic flux density at different radial distances with respect to an electrically conductive path according to embodiments herein.

FIG. 4 is an example diagram illustrating a top (cutaway) view of an inductor device and variation in magnetic flux density at different radial distances with respect to an electrically conductive path according to embodiments herein.

In FIG. 4, the electrically conductive path 131 is disposed between a diameter defined by radius C and radius E. As previously discussed, inductor device 110 includes two concentric rings (layers) of core material where the outer layer (magnetically permeable material 142 between A and B) is fabricated from a higher magnitude magnetically permeable material than material between radius C and radius B; the inner layer of magnetically permeable material 141 (between radius B and C) has a lower permeability than material 142 and is subject to a higher H field according to the formula $$H = \frac{i}{2\pi r}.$$

However, this solution only partially solves the problem as the flux distribution inhomogeneity is reduced as shown in graph 460 of FIG. 4. The reason for the reduced change in magnetic flux density (as shown by function 461) outward from radius C to radius B is that, as the H field decreases further from the core electrically conductive path 131, based on the distance radius r from center point D, the flux density decreases. In order to compensate for the decrease in flux density, the fabricator 150 selects the magnetically permeable material 142 to have a higher magnetic permeability.

Thus, in this example embodiment, the magnetic permeability of material disposed at further distances from the electrically conductive path 131 increases as a function of the radius from the electrically conductive path 131. In other words, in one embodiment, the magnitude of the magnetic permeability of material further from the electrically conductive path 131 increases as the radius from the electrically conductive path 131 increases.

Figure 5B:
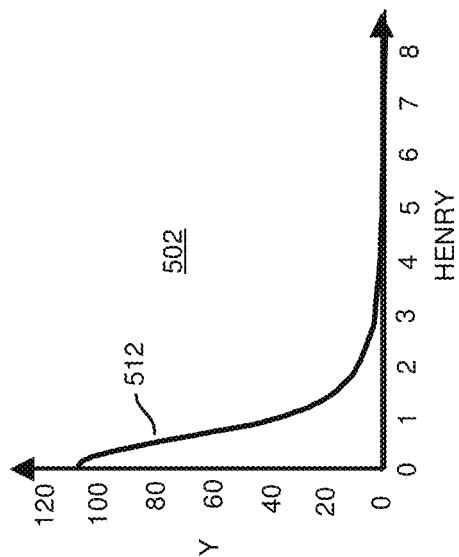
FIG. 5B is an example diagram illustrating permeability versus magnetization for a second material according to embodiments herein.
Figure 5A:
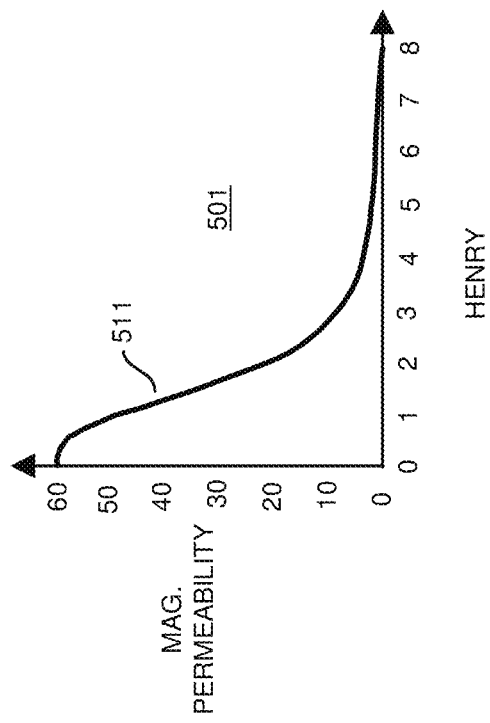
FIG. 5A is an example diagram illustrating permeability versus magnetization for a first material according to embodiments herein.

FIG. 5A is an example diagram illustrating permeability versus magnetization for a first material according to embodiments herein.

In one embodiment, the magnetically permeable material 141 has a magnetic permeability 511 as shown in graph 501. However, as previously discussed, note again that the magnetic permeability of the magnetically permeable material 141 can be any suitable value.

FIG. 5B is an example diagram illustrating permeability versus magnetization for a first material according to embodiments herein.

In one embodiment, the magnetically permeable material 142 has a magnetic permeability 512 as shown in graph 502. However, as previously discussed, note again that the magnetic permeability of the magnetically permeable material 141 can be any suitable value.

As shown, the magnetic permeability of the magnetically permeable material 142 is greater than the magnetic permeability of the magnetically permeable material 141.

Figure 6B:
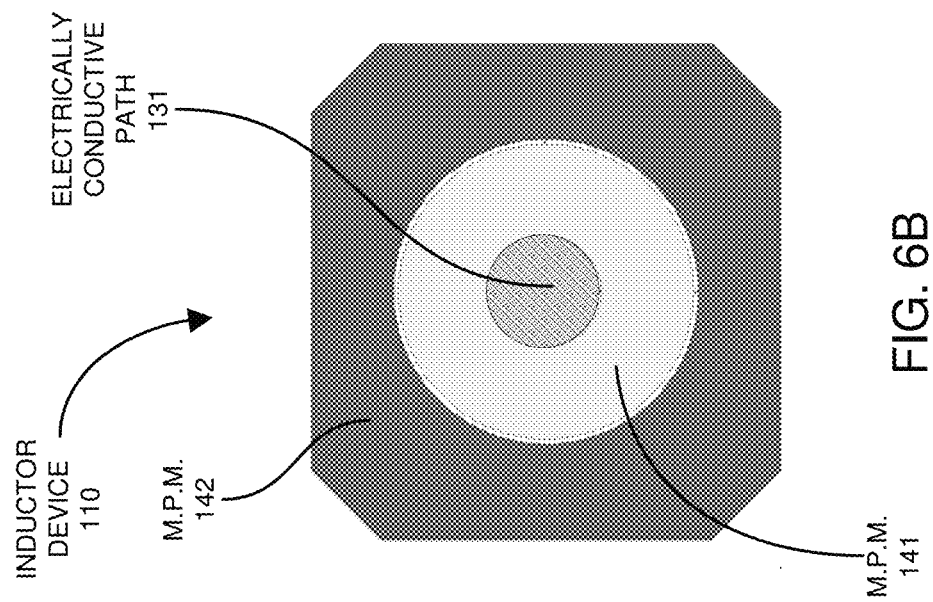
FIG. 6B is an example top view diagram of an inductor device according to embodiments herein.
Figure 6A:
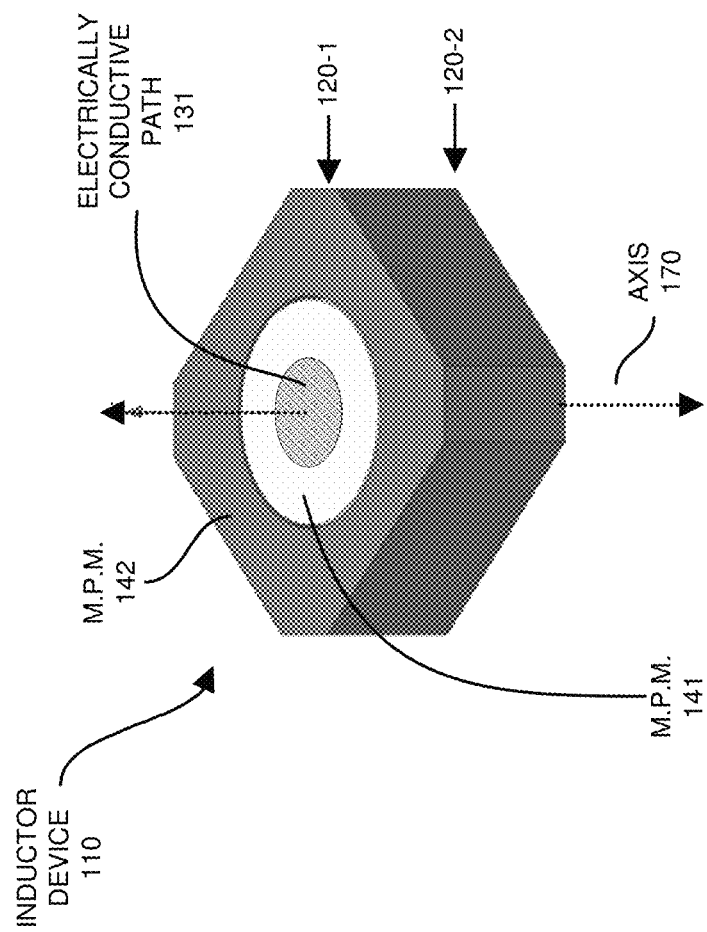
FIG. 6A is an example 3-D diagram of an inductor device according to embodiments herein.

FIG. 6A is an example 3-D diagram of an inductor device according to embodiments herein.

In a manner as previously discussed, the electrically conductive path 131 is surrounded by magnetically permeable material 141. Magnetically permeable material 141 is surrounded by magnetically permeable material 142.

FIG. 6B is an example top view diagram of an inductor device according to embodiments herein.

In one embodiment, a simulation of the inductor device 110 in FIG. 6B results in an increased inductance value via a smaller inductor component. For example, the structure of the inductor device 110 affords multiple advantages such as increased inductance (enabling the inductor device 110 to fit in a smaller space or volume) and increased flux density distribution such as above 1 T (Tesla) for a considerably smaller amount of core volume. This indicates that the peak current handling capability of this structure (inductor device 110 having variable magnetic permeability) is notably higher than the conventional inductor device in FIG. 2 (homogeneous magnetic permeability).

Note that the dimensions of the two core pieces (such as magnetically permeable material 141 and magnetically permeable material 142) can be optimized based on the permeability characteristics of the two core materials and a targeted current level.

Note that further example embodiments include a monolithic core having radially varying permeability characteristics in which the magnitude of the magnetic permeability of material increases for greater radius values from the electrically conductive path 131. In one embodiment, this is achieved via blending two or more core materials with different permeabilities (e.g. high and low permeability) such that the ratio of high permeability to low permeability material increases from the inside (such as near the electrically conductive path 131) to the outside of the structure (further away from the electrically conductive path 131). This is further shown in FIG. 7B. Further embodiments of a multi-layered inductor device 110 are shown in FIG. 7A.

FIG. 7A is an example diagram illustrating an inductor device including multiple concentric layers of different magnetically permeable material and flux paths through the multiple layers carrying corresponding flux according to embodiments herein.

As previously discussed, in one embodiment, the magnetic permeability of the core of the inductor device 110-7 surrounding the electrically conductive path 131 varies as a function of a radial distance outward from the electrically conductive path 131 (or center of axis 170).

More specifically, the magnetic permeability of the core material associated with the inductor device 110-7 increases in magnitude as the radial distance from the electrically conductive path 131 increases.

In theory, the inductor device 110-7 (version of the inductor device in FIG. 1 but more layers of magnetically permeable material) includes an infinite number of flux paths through each layer of magnetically permeable material to convey/carry respective flux created via flow of current through the electrically conductive path 131.

For example, (homogeneous) layer of magnetically permeable material 141 (between radius R1 and R2) includes multiple flux paths including at least concentric flux path 741 through magnetically permeable material 141 (in theory, layer of magnetically permeable material 141 includes an infinite number of flux paths to carry flux). In this example embodiment, concentric flux path 741 carries corresponding flux 791 generated as a result of current flowing through the electrically conductive path 131.

Homogeneous layer of magnetically permeable material 142 (between radius R2 and R3) includes multiple flux paths including at least concentric flux path 742 through magnetically permeable material 142. Concentric flux path 742 carries corresponding flux 792 generated as a result of current flowing through the electrically conductive path 131 (out of the diagram toward viewer).

Homogeneous layer of magnetically permeable material 143 (between radius R3 and R4) includes multiple flux paths including at least concentric flux path 743 through magnetically permeable material 143. Concentric flux path 743 carries corresponding flux 793 generated as a result of current flowing through the electrically conductive path 131.

Homogeneous layer of magnetically permeable material 144 (between radius R4 and R5) includes multiple flux paths including concentric flux path 744 through magnetically permeable material 144. Concentric flux path 744 carries corresponding flux 794 generated as a result of current flowing through the electrically conductive path 131.

As previously discussed, the inductor device 110-7 can include any number of layers of magnetically permeable material.

FIG. 7B is an example diagram illustrating variation in magnitude of the magnetic permeability of the inductor device with respect to a distance from the electrically conductive path according to embodiments herein.

More specifically, graph 700 illustrates different implementations of varying the magnitude of magnetic permeability with respect to the electrically conductive path 131 (and/or corresponding center of inductor device 110-7).

As shown in graph 700 via function 781 (line), in one embodiment, the magnetic permeability of magnetically permeable material 141 disposed in concentric layer between radius R1 and R2 has a magnetic permeability of MP1; the magnetic permeability of magnetically permeable material 142 disposed in concentric layer between R2 and R3 has a magnetic permeability of MP2; the magnetic permeability of magnetically permeable material 143 disposed in concentric layer between R3 and R4 has a magnetic permeability of MP3; and so on.

As previously discussed, the magnitude of the magnetic permeability of material increases based on further distances from the electrically conductive path 131. For example, a magnitude of the magnetic permeability MP2 is greater than magnetic permeability MP1; a magnitude of the magnetic permeability MP3 is greater than a magnitude of the magnetic permeability MP2; a magnitude of the magnetic permeability MP4 is greater than a magnitude of the magnetic permeability MP3; etc.

Further embodiments herein include (as indicated by function 782) implementing a continuous (linear) gradient of varying the magnitude of the magnetic permeability settings of core material associated with the inductor device 110-7 with respect to the radius.

Thus, as indicated by function 782 (or function 781), a change in the magnetic permeability in the core of the inductor device 110-7 as a function of the distance from the electrically conductive path 131 is substantially linear. In such an embodiment, the variable permeability of the magnetically permeable material in the core of the inductor device 110-7 results in a substantially same magnetic density of magnetic flux throughout the magnetically permeable material (such as material 141, 142, 143, 144, etc.) based on a respective flow of current throughout the electrically conductive path 131 producing the magnetic flux.

Figure 8:
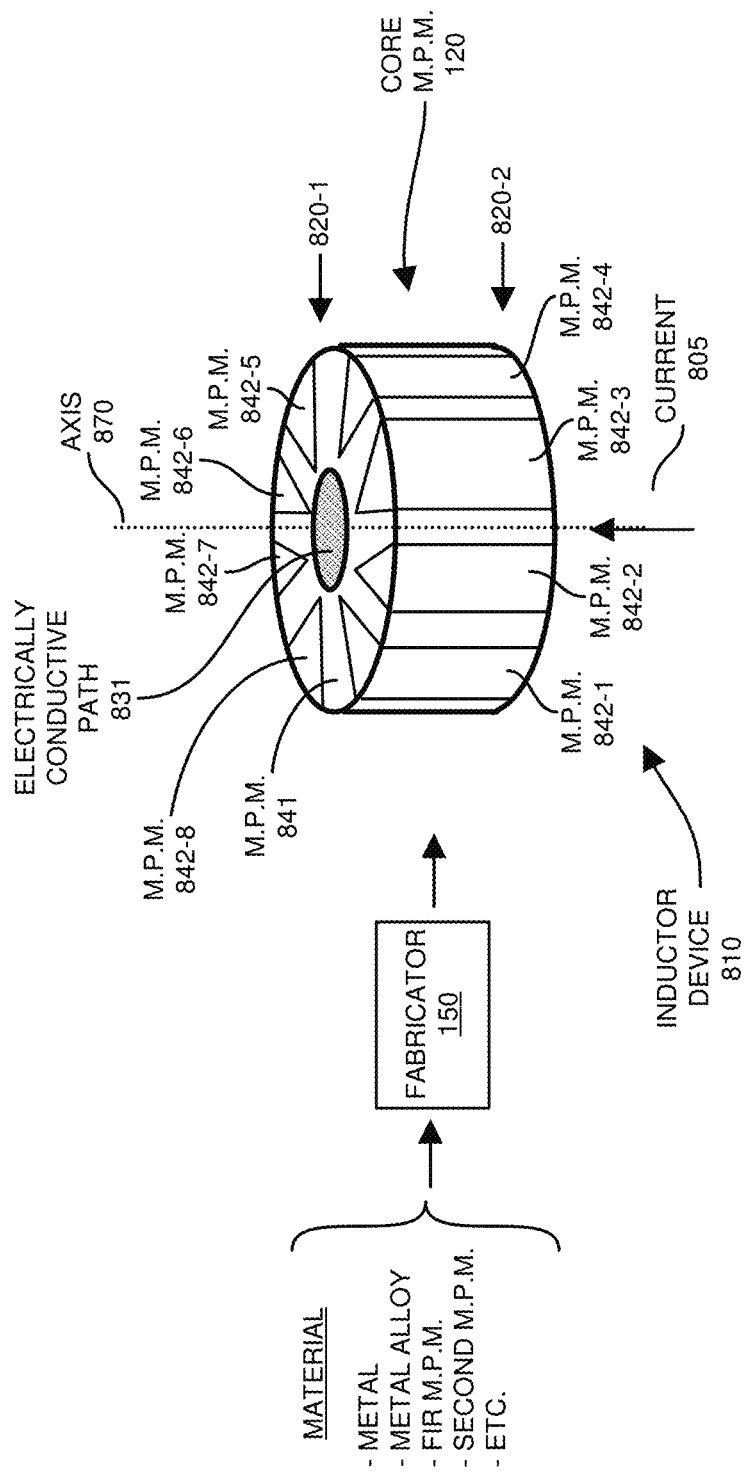
FIG. 8 is an example three-dimensional view of an inductor device according to embodiments herein.

FIG. 8 is an example 3-dimensional diagram illustrating an inductor device fabricated from multiple types of magnetically permeable material and flow of flux according to embodiments herein.

Further embodiments herein include inductor device 810 fabricated from two or more different magnetically permeable materials.

In this example embodiment, the interspersing of magnetically permeable material 841 and magnetically permeable material 842 in the inductor device 810 produces a new magnetic structure, which enables a gradual and continuous permeability increase from the inner part of the core such as the electrically conductive path 831 towards the outer radius of the inductor device 810. In such an instance, the variations in magnetically permeable material of the inductor device 810 enables a more homogenous flux density distribution produced from flowing current 805. The fabrication of the inductor device 810 as discussed herein results in a higher inductance and smaller overall volume (footprint) compared to conventional inductor devices.

In one embodiment, the higher inductance and better performance associated with the inductor device 810 is achieved through a permeability-optimized core shown in FIG. 8, where the novel concept of so-called "reverse air-gap" is introduced.

It is noted that, in a conventional magnetic structure, since the relative permeability of the air is 1, air-gaps are sometimes introduced in order to reduce the permeability of the magnetic path and therefore to avoid saturation and to store energy when needed. In contrast, in the proposed inductor device 810, an alternative concept is applied.

For example, starting from a core made out of low permeability material such as material 841 nearer to the electrically conductive path 831, the gaps as discussed herein (such as wedges or other suitable shape) are purposely created via removal of a portion of material 841 and then filling in those gaps with magnetically permeable material 842 (which has a higher magnetic permeability than the magnetically permeable material 841).

The triangular or wedge shapes (such as magnetically permeable material 842-1, magnetically permeable material 842-2, magnetically permeable material 842-3, magnetically permeable material 842-4, magnetically permeable material 842-5, magnetically permeable material 842-6, magnetically permeable material 842-7, and magnetically permeable material 842-8) of the inductor device 810 are disposed between portions of the magnetically permeable material 841.

The filling of gaps of the inductor device 810 with high permeable material 842 (such as magnetically permeable material 842 between the magnetically permeable material 841 ensures that the effective permeability of the overall magnetic structure of the inductor device 810 increases gradually from the inner part of the core (such as nearest the electrically conductive path 831) outward.

Note that the number of high-permeability gaps (such as magnetically permeable material 842), their shape and their material can be, of course, tuned according to the requirement of the inductor device 810 (target inductance, current rating, max B flux, etc.) in order to achieve a homogenous flux distribution as further discussed herein.

Note further that embodiments herein can be extended to standard inductors (e.g. wire-wound toroid inductors) with one or more arbitrary shapes, e.g. rectangular and oval shapes.

In this example embodiment, the fabricator 150 receives materials such as one or more metals, metal alloy, first magnetically permeable material, second magnetically permeable material. etc.

The fabricator 150 fabricates the inductor device 810 to include an electrically conductive path 831 and magnetically permeable material 841. The electrically conductive path 831 extends along axis 870 through the core of the inductor device 810 from a first end 820-1 of the inductor device 810 to a second end 820-2 of the inductor device 810.

In one embodiment, the fabricator 150 produces the core of the inductor device 810 as a cylinder, although other shapes are possible. In further example embodiments, the fabricator 150 drills a hole along axis 870 of a cylindrical device of magnetically permeable material 841 and inserts the electrically conductive path 810. The fabricator 150 removes a portion of the magnetically permeable material 841 in the original cylinder and inserts magnetically permeable material 842 (such as wedges) in such gaps as shown. Thus, the fabricator 150 fabricates the core of the inductor device 110 to have a magnetic permeability that varies depending on a radial distance outward with respect to the electrically conductive path 131.

More specifically, presence of the magnetically permeable material 841 and magnetically permeable material 842 transforms the electrically conductive path 831 into an inductive path (a.k.a., inductor device 810). For example, flow of current 805 through the electrically conductive path 831 (inductive path) results in generation of respective magnetic flux in a similar manner as previously discussed.

In yet further embodiments, the fabricator 150 as described herein fabricates the inductor device 810 such that core material (two or more different magnetically permeable materials such as magnetically permeable material 841, magnetically permeable material 842, etc.) through which the electrically conductive path 831 passes does not include any air gaps or voids that are not filled with magnetically permeable material.

In one embodiment, the electrically conductive path 831 is made from any suitable conductive material such as metal, a metal alloy (combination of multiple different metals), etc.

Note further that the electrically conductive path 831 can be fabricated as any suitable shape such as rod-shaped, pillar-shaped, etc. In one embodiment, each of the electrically conductive paths is a non-winding circuit path extending through the inductor device 810. Note that the inductor device 810 can be fabricated as being cylindrical or any other suitable shape.

Thus, embodiments herein include a novel inductor device 810 comprising a core fabricated from two or more different types of magnetically permeable material such as magnetically permeable material 841, magnetically permeable material 842, etc. The inductor device 810 includes an electrically conductive path 831 extending through the magnetic permeable core. As shown, and as further discussed herein, the effective magnetic permeability of the core of inductor device 810 varies in magnitude depending on a distance (radius) with respect to the electrically conductive path 831.

The inductor device 810 as shown supports one or more of the following: i) vertical power flow, ii) reduced EMI (ElectroMagnetic Interference) due to the absence of any air-gap, iii) more homogeneous flux distribution in each of the layer of magnetically permeable material due to the optimized effective permeability, iv) higher inductance per volume compared to conventional inductor devices, etc.

Figure 9:
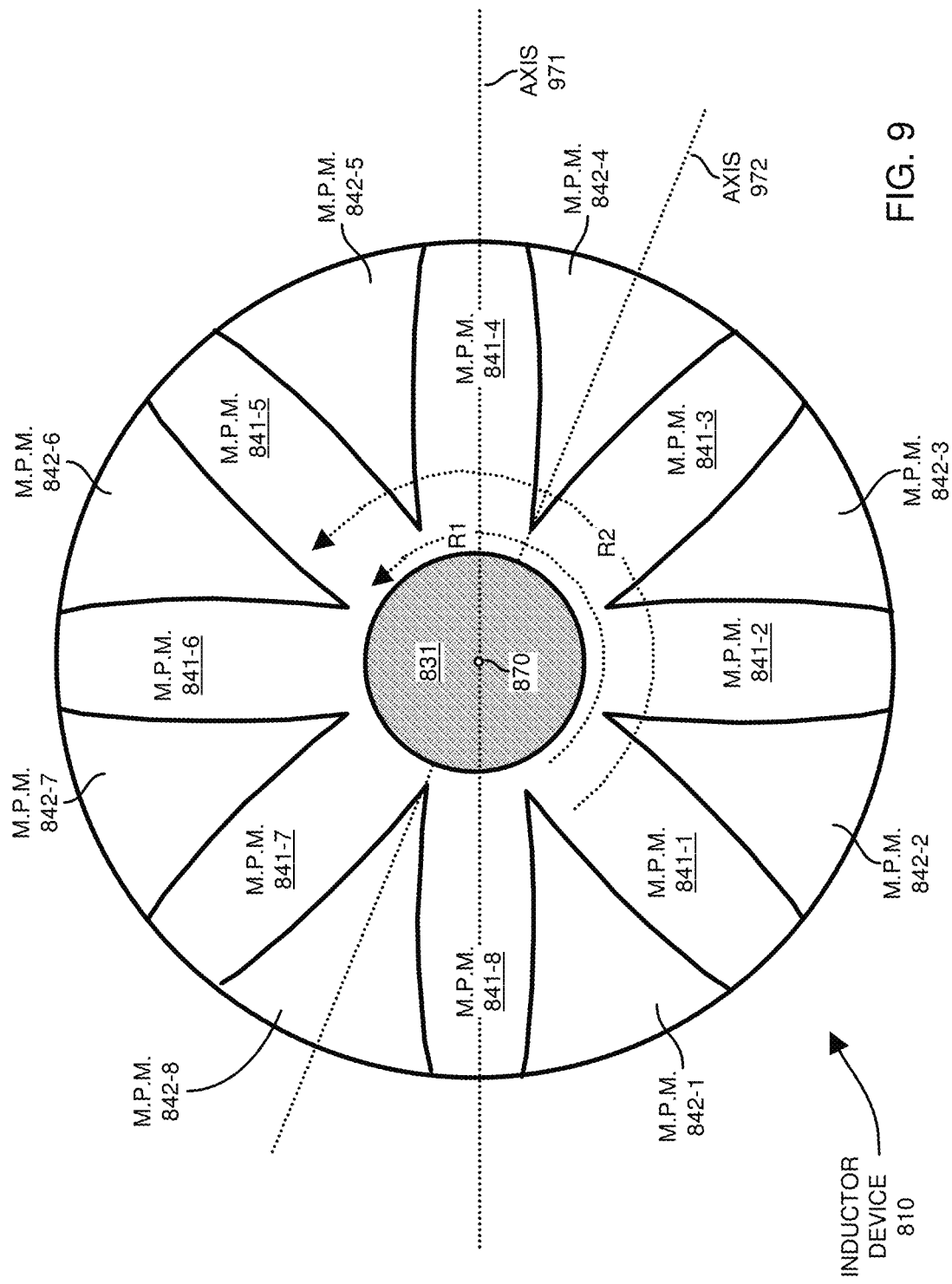
FIG. 9 is an example top view diagram illustrating an inductor device fabricated from multiple types of magnetically permeable material and flow of flux according to embodiments herein.

FIG. 9 is an example diagram illustrating an inductor device fabricated from multiple types of magnetically permeable material and flow of flux according to embodiments herein.

This embodiment illustrates interlacing of different magnetically permeable material in the inductor device 810 to provide improved performance. The inductor device 810 of FIG. 9 is viewed along axis 870.

As previously discussed, the fabricator 150 removes a portion of the original magnetically permeable material 841, resulting in creation of fins 841-1, 841-3, 841-4, 841-5, 841-6, 841-7, and 841-8. The fabricator 150 fills in spaces/volume between the fins with material 842 to create wedges (such as magnetically permeable material 842-1, 842-2, 842-3, 842-4, 842-5, 842-6, 842-7, 842-8).

Thus, in one embodiment, the magnetically permeable material in the core of the inductor device 810 includes alternating instances of first magnetically permeable material 841 and second magnetically permeable material 842 along a concentric path. The first magnetically permeable material 841 is fabricated as one or more fins extending radially outward from the electrically conductive path 810. The second magnetically permeable material 842 fills in gaps between the fins to produce wedges.

In such an instance, a cross section of the inductor device 810 in FIG. 9 as viewed along an axis 870 of the electrically conductive path 810 includes wedges of the second magnetically permeable material 842 disposed between portions of the first magnetically permeable material 841.

More specifically, magnetically permeable material 842-1 is disposed between magnetically permeable material 841-8 and magnetically permeable material 841-1; magnetically permeable material 842-2 is disposed between magnetically permeable material 841-1 and magnetically permeable material 841-2; magnetically permeable material 842-3 is disposed between magnetically permeable material 841-2 and magnetically permeable material 841-3; and so on.

As previously discussed, the second magnetically permeable material has a higher magnetic permeability than the first magnetically permeable material.

Figure 10:
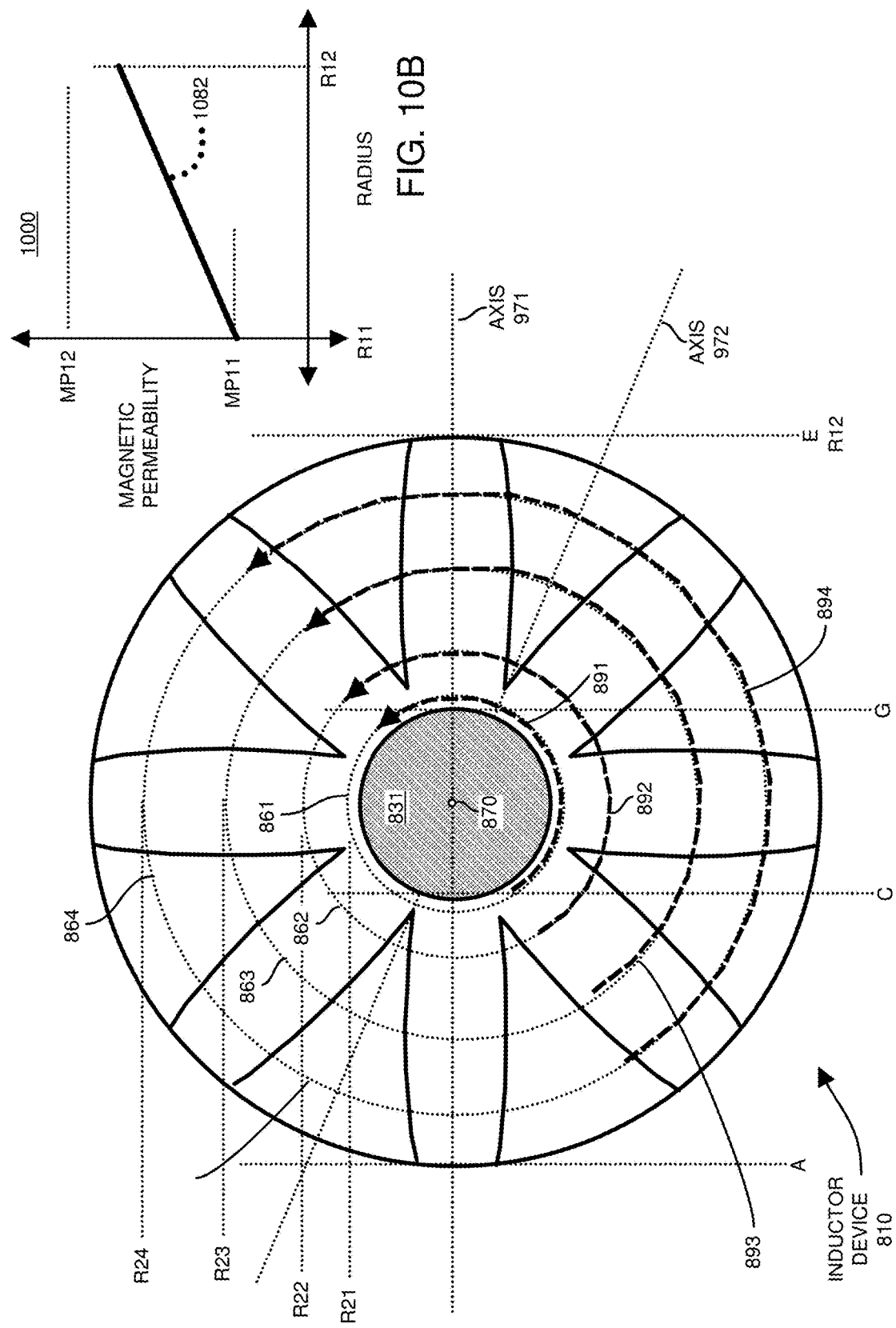
FIG. 10A is an example top view diagram illustrating an inductor device fabricated from multiple types of magnetically permeable material and flow of flux on respective flux paths according to embodiments herein.
FIG. 10B is an example graph illustrating variations of magnetic permeability in an inductor device with respect to a radius according to embodiments herein.

Thus, in yet further example embodiments, a first radius R1 about the axis 870 of the electrically conductive path 831 intersects only the first magnetically permeable material 841 in the core of the inductor device 810 at different angular positions as shown. However, a second radius R2 about the axis 870 of the electrically conductive path 831 intersects the first magnetically permeable material 841 and second magnetically permeable material 842 in the core at different angular positions. This is further shown in FIG. 10.

FIG. 10A is an example diagram illustrating an inductor device fabricated from multiple types of magnetically permeable material and flow of flux on respective flux paths according to embodiments herein.

In this example embodiment, the inductor device 810 includes multiple flux paths to convey respective flux through the different magnetically permeable material 841 and/or 842 between radius R11 and R12. Current 805 through the electrically conductive path 831 produces respective flux b 891, 892, 893, 894, etc.

More specifically, the inductor device 810 includes a flux path 861 at radius R21 with respect to axis 870 of the electrically conductive path 831. The flux path 861 conveys respective flux 891 through only the magnetically permeable material 841.

The inductor device 810 includes a flux path 862 at radius R22 with respect to axis 870 of the electrically conductive path 831. As shown, the flux path 862 conveys respective flux 892 through alternating presence of magnetically permeable material 841 and magnetically permeable material 842.

The inductor device includes a flux path 863 at radius R23 with respect to axis 870 of the electrically conductive path 831. As shown, the flux path 863 conveys respective flux 893 through alternating presence of magnetically permeable material 841 and magnetically permeable material 842.

The inductor device includes a flux path 864 at radius R24 with respect to axis 870 of the electrically conductive path 831. As shown, the flux path 864 conveys respective flux 894 through alternating presence of magnetically permeable material 841 and magnetically permeable material 842.

Thus, certain flux paths (such as 862, 863, 864) alternate between passing through first magnetically permeable material 841 and second magnetically permeable material 842 in the core of the inductor device 810. As previously discussed, the second magnetically permeable material 842 has a higher magnetic permeability than the first magnetically permeable material 841.

As depicted in FIG. 10A, each flux path of greater radius from the axis 870 passes through a higher ratio of the second magnetically permeable material 842 to the first magnetically permeable material 841 than a respective inner flux path.

For example, along its circumference, the flux 892 and corresponding flux path 862 result in passing through a first ratio (based on path lengths) of second magnetically permeable material 842 to the first magnetically permeable material 841. The flux 893 and corresponding flux path 863 result in passing through a second ratio (based on path lengths) of second magnetically permeable material 842 to the first magnetically permeable material 841. The flux 894 and corresponding flux path 864 result in passing through a third ratio (based on path lengths) of second magnetically permeable material 842 to the first magnetically permeable material 841.

The third ratio is greater than the second ratio; the second ratio is greater than the first ratio. Thus, the effective magnetic permeability (based on portions of the magnetically permeable material 841 and magnetically permeable material 842 through which the flux passes) of the material at different radii from the axis 870 increases for greater radii values.

Graph 1000 in FIG. 10B illustrates the effective magnetic permeability of the different magnetic flux paths passing through the different magnetically permeable material of the inductor device 810. For example, assume that the magnetic permeability of the magnetically permeable material 841 is MP1 and that the magnetic permeability of the magnetically permeable material 842 is MP2, where MP2 is greater than MP1. The radius R11 of the inductor device 810 has a magnetic permeability of MP1. The magnetic permeability of the core increases linearly (from R11 to R12) as indicated by the function 1082 depending on the magnitude of the radius.

Thus, the result of increased magnetically permeable material away from the electrically conductive path 831 results in a more even distribution of flux throughout the core material, and increased inductance as further shown below.

Figure 11:
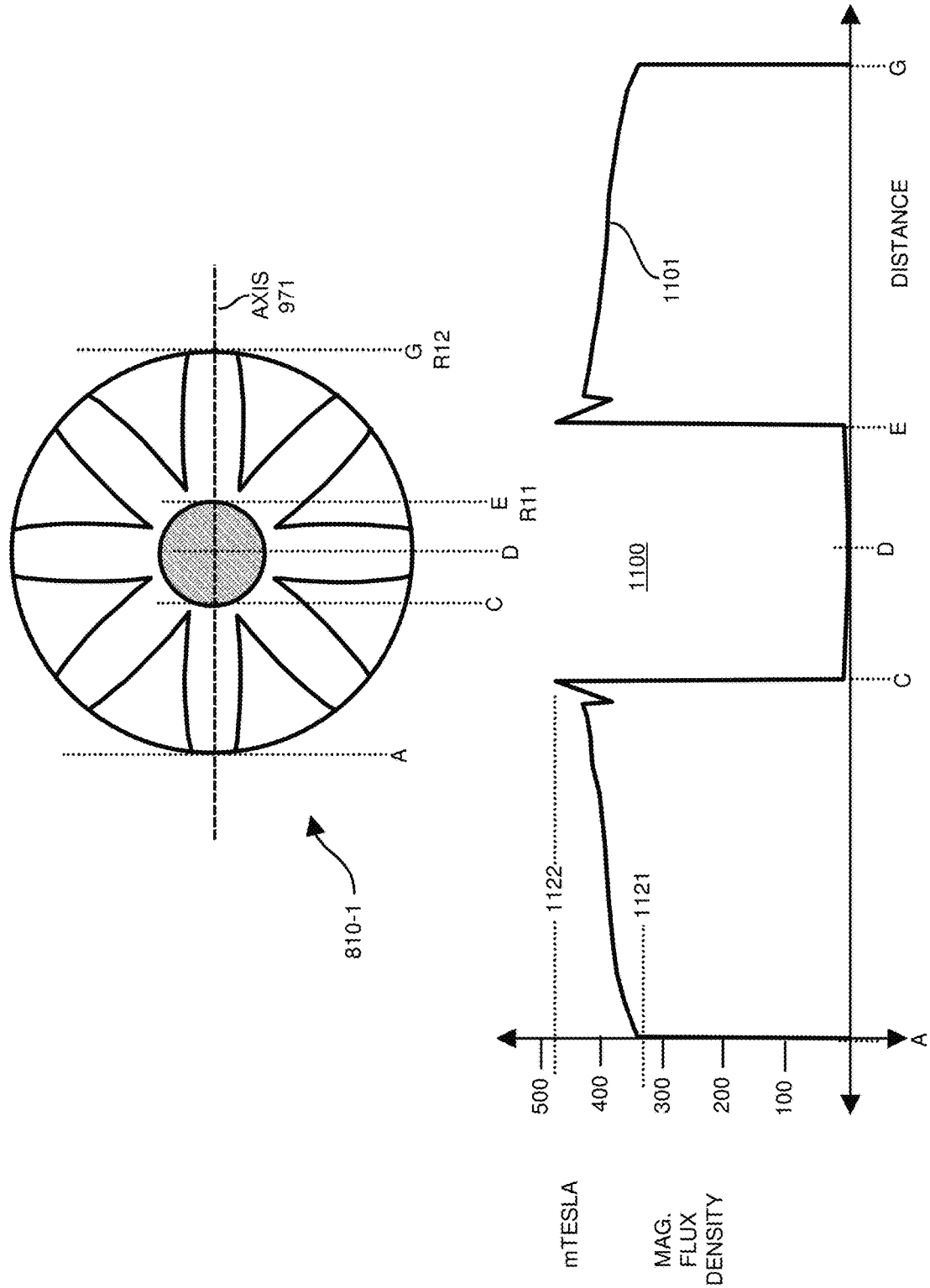
FIG. 11 is an example diagram illustrating a top (cutaway) view of a first implementation of an inductor device and example graph indicating variation in magnetic flux density at different radial distances with respect to an electrically conductive path according to embodiments herein.

FIG. 11 is an example diagram illustrating a top (cutaway) view of a first implementation of an inductor device and variation in magnetic flux density at different radial distances with respect to an electrically conductive path according to embodiments herein.

In one embodiment, the fabricator 150 fabricates the inductor device 810 to have the following properties:

magnetically permeable material 841 has permeability: μ: 52

μ vs Hdc curve is depicted in FIG. 3

High-permeability gaps such as magnetically permeable material 842 are fabricated from (standard ferrite): μ=500 (constant wrt Hdc)

Core height from first end 820-1 to second end 820-2: 3.1 mm

Core diameter A to G: 6.5 mm

Central copper rod (electrically conductive path 831) diameter: 1.7 mm

Current 805: 48 Amps DC.

Figure 12:
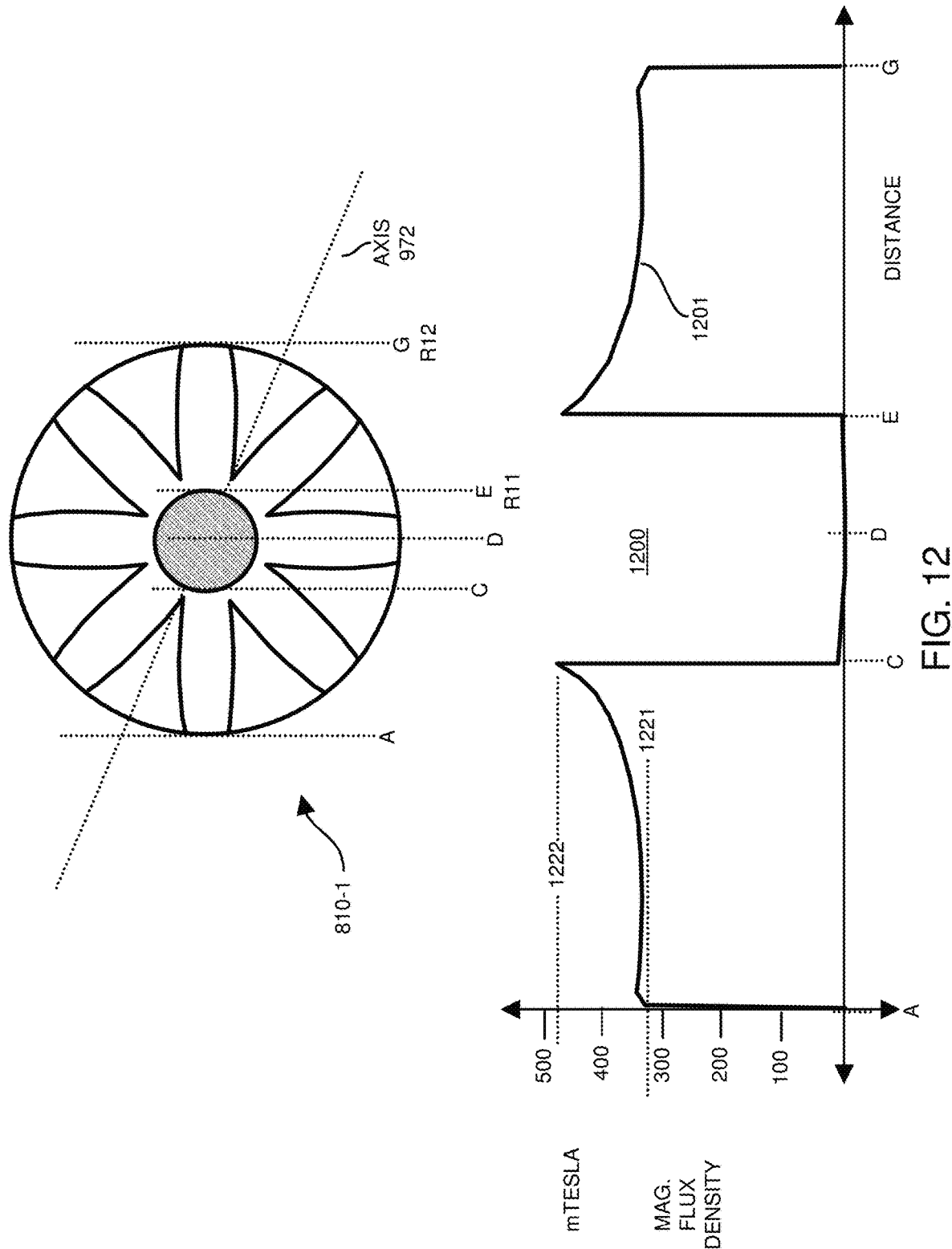
FIG. 12 is an example diagram illustrating a top (cutaway) view of a first implementation of an inductor device and example graph indicating variation in magnetic flux density at different radial distances with respect to an electrically conductive path according to embodiments herein.

The resulting flux distribution (magnetic flux density 1101 and magnetic flux density 1201) is show in FIG. 11 for axis 971 and FIG. 12 for axis 972. As previously discussed, the permeability the flux distribution over the core is now greatly equalized (such as between level 1121 and level 1122) as also plotted by function 1101 in the graph 1100 and function 1201 (such as between level 1221 and level 1222) in graph 1200.

Thus, as previously discussed, the magnetic permeability of the inductor device 810 gradually increases over the core radius and is a result of shaped high permeability gaps (842-1, 842-2, 842-3, etc.), the flux density distribution is now pushed up, and is greatly flattened and equalized to ≈350 mT (between level 1121 and 1122) as shown in FIG. 11 and (between level 1221 and level 1222 in) FIG. 12. Since the inductance of the inductor device 810 is directly proportional to the magnetic permeability, pushing up and equalizing the magnetic flux density in the outer area of the core (between A and C) of the inductor device 810 results in an increased inductance associated with the inductor device 810-1 compared to an inductor device fabricated from only a single magnetically permeable material.

Note that the benefit of the flux equalization can be not only exploited in order to increase the inductance (while keeping the same dimensions) but also to decrease the dimensions of the core.

Decreasing, for example, the height of the core (such as between first end 820-1 and second end 820-2) leads to a reduction of the core cross-section area and therefore to an increase of the core's reluctance. Nevertheless, based on the flux equalization resulting from the novel use of multiple different magnetically permeable materials to fabricate the inductor device 810, the core's reluctance increase is now compensated by the effective permeability increase according to the following formula:

$$R = \frac{l_m}{\mu_{eff} A_{core}}$$

Where $l_m$ is the magnetic path length (unchanged), $A_{core}$ is the core area (decreased) and $\mu_{eff}$ is the effective permeability (increased). See also results ins FIGS. 13 and 14 for the inductor device of reduced size.

Thus, the inductor devices as described herein provides advantages and is useful over conventional inductor devices. For example, the inductance provided by each of the electrically conductive paths (inductive paths) in the inductor device as described herein is easily controlled based on parameters such as: i) distance between the first end of the inductor device to the second end of the inductor device, ii) magnetic permeability of the different magnetically permeable material used to fabricate the core, iii) overall increased inductance for a smaller sized component, etc.

Figure 13:
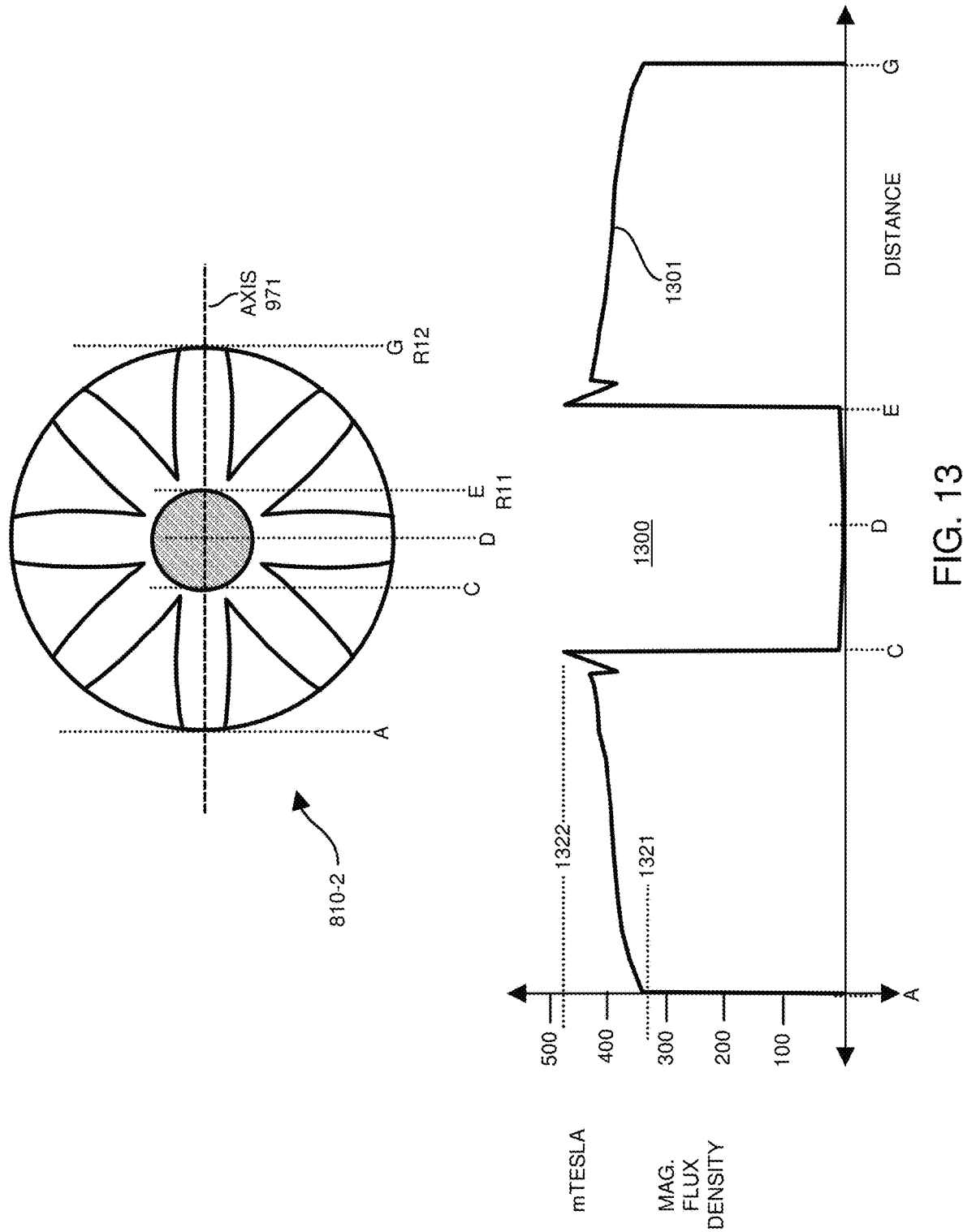
FIG. 13 is an example diagram illustrating a top (cutaway) view of a first implementation of an inductor device and example graph indicating variation in magnetic flux density at different radial distances with respect to an electrically conductive path according to embodiments herein.

FIG. 13 is an example diagram illustrating a top (cutaway) view of a first implementation of an inductor device and variation in magnetic flux density at different radial distances with respect to an electrically conductive path according to embodiments herein.

In this example embodiment, assume that the height of the inductor device 810-2 is approximately 30% smaller (i.e., 2.2 mm rather than 3.1 mm) the same diameter of the inductor device 810-1 is the same as above in FIG. 11, the same low permeability material and the same current excitation is used to produce the graphs 1300 and 1400.

In one non-limiting example embodiment, the fabricator 150 fabricates the inductor device 810-2 to have following characteristics:

Low permeability core of magnetically permeable material 841 is: μ: 52
μvs Hdc curve as depicted in FIG. 2
High-permeability gaps (standard ferrite): magnetic permeability of magnetically permeable material 842 is μ=500 (constant magnetic permeability value with respect to Hdc)
Core height: 2.2 mm
Core diameter: 6.5 mm
Central copper rod diameter: 1.7 mm
Current 805: 48 Adc.

Figure 14:
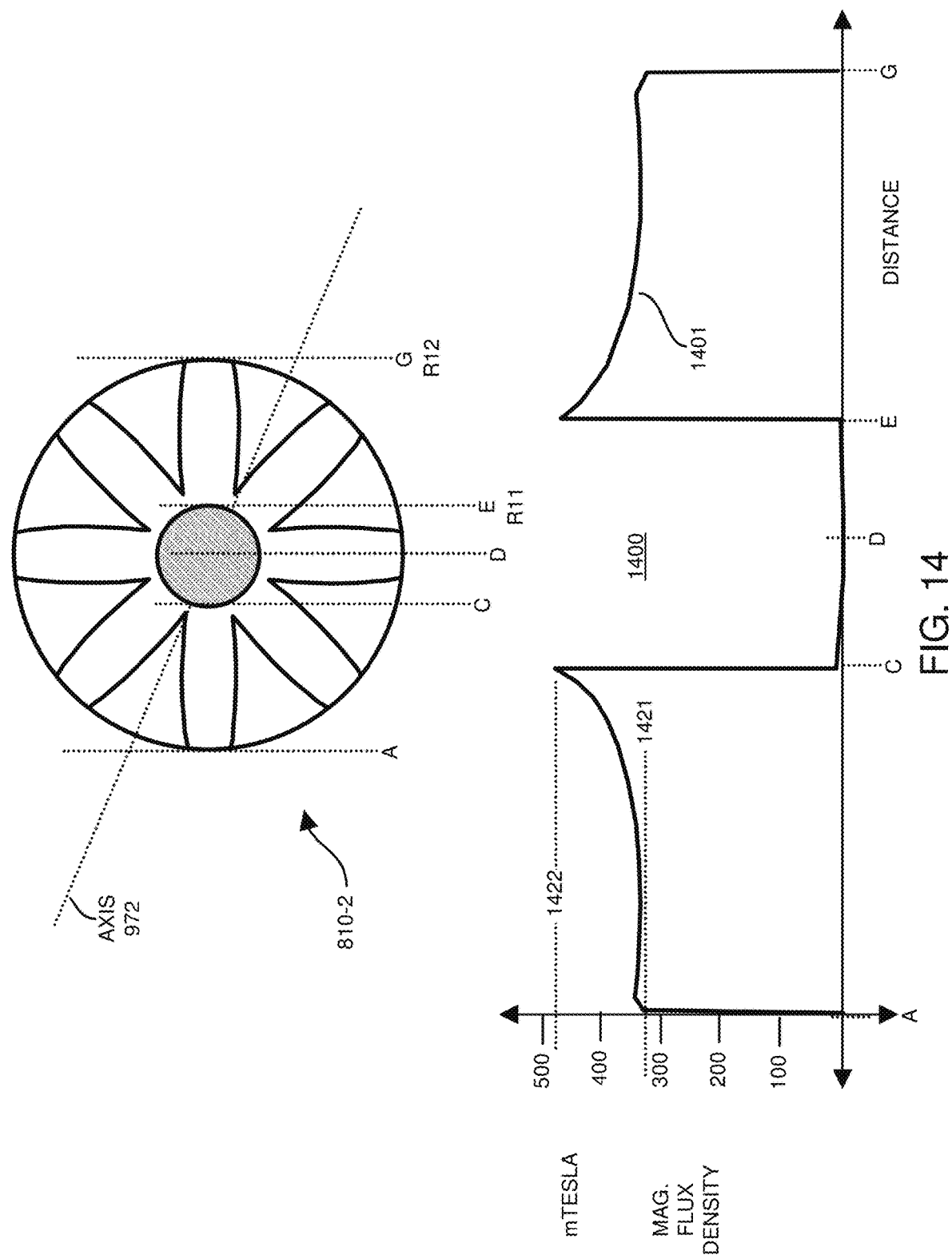
FIG. 14 is an example diagram illustrating a top (cutaway) view of a first implementation of an inductor device and example graph indicating variation in magnetic flux density at different radial distances with respect to an electrically conductive path according to embodiments herein.

The flux equalization associated with this instance of the inductor device 810-2 enables the effective permeability increase as show in FIG. 13 (graph 1300 and function 1301 indicating magnetic flux density along axis 971 based on the above conditions) and FIG. 14 (graph 1400 and function 1401 indicating magnetic flux density along axis 972 based on the above conditions) allowing a respective fabricator to keep the same inductance value (with respect to a 30% higher height core made out of only the low permeability material), despite the core height reduction. As previously discussed, via the novel core 120, the magnetic flux density over the core is now greatly equalized (such as between level 1321 and level 1322) as also plotted by function 1301 in the graph 1300 and function 1401 (such as between level 1421 and level 1422) in graph 1400.

Figure 15:
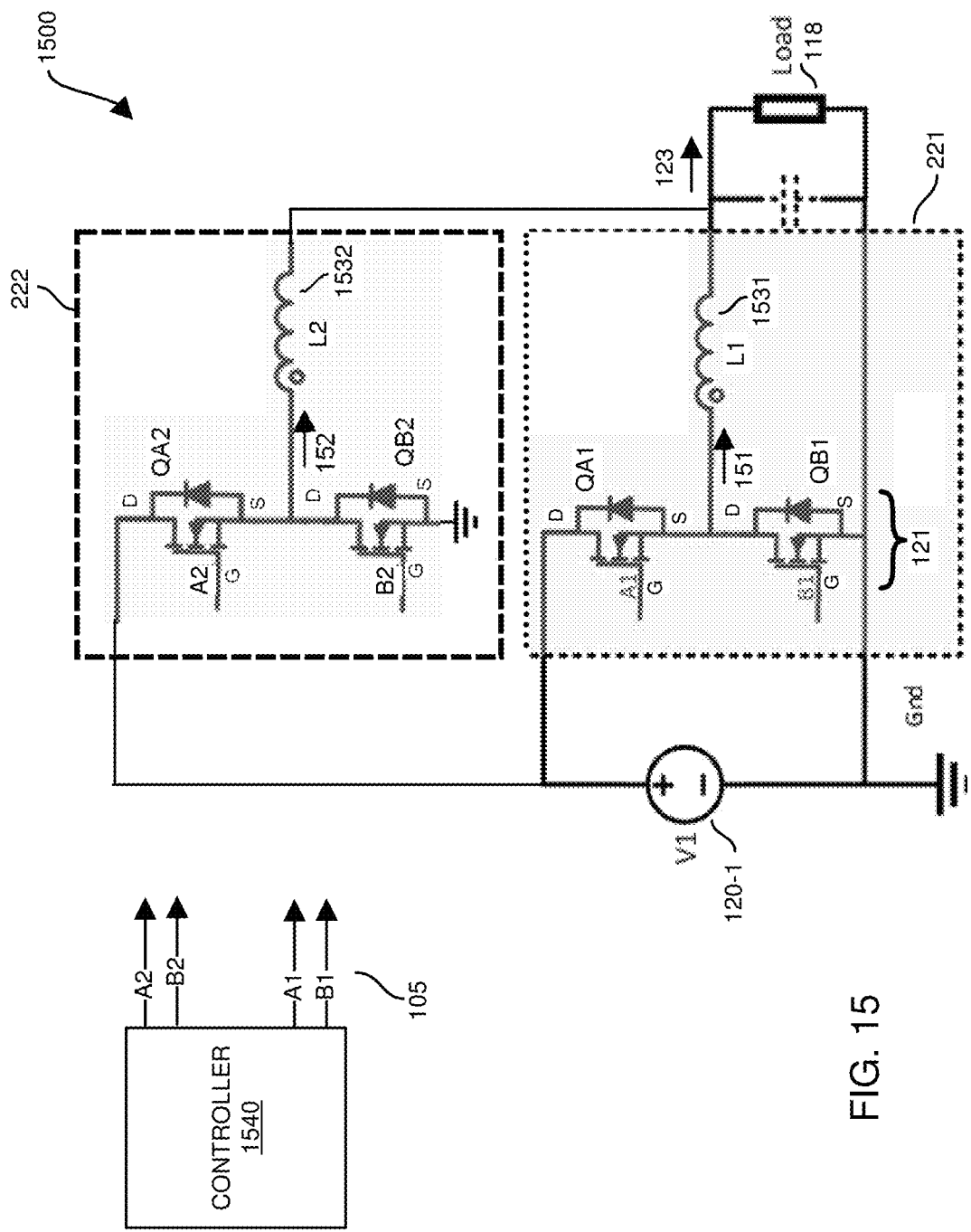
FIG. 15 is an example diagram illustrating connectivity of circuit components in a power supply including one or more inductor devices according to embodiments herein.

FIG. 15 is an example diagram illustrating connectivity of circuit components in a power supply according to embodiments herein.

In this non-limiting example embodiment, the power supply 1500 includes controller 1540 and multiple phases 221 and 222 that collectively generate a respective output voltage 123 (output current) to power load 118. The load 118 can be any suitable circuit such as CPUs (Central Processing Units), GPUs and ASICs (such those including one or more Artificial Intelligence Accelerators), etc., which can be located on standalone circuit board.

Note that power supply 1500 can include any number of phases. If desired, the phases can be split such that the first phase 221 powers a first load independent of the second phase 222 powering a second load. Alternatively, the combination of phase 221 and phase 222 drive the same load 118.

As shown in the example embodiment of operating a combination of the phase 221 and phase 222 to power the same load 118, phase 221 includes switch QA1, switch QB1, and inductive path 1531 (such as inductor device 110, inductor device 810, etc.). Phase 222 includes switch QA2, switch QB2, and inductive path 1532.

Further in this example embodiment, the voltage source 120-1 supplies voltage V1 (such as 6 VDC or any suitable voltage) to the series combination of switch QA1 (such as a high-side switch) and switch QB1 (such as a low-side switch).

In one embodiment, the combination of switch QA1 and QB1 as well as inductive path 1531 (inductor such as implemented via inductor device 110, inductor device 810, etc.) operate in accordance with a buck converter topology to produce the output voltage 123.

Further in this example embodiment, note that the drain node (D) of switch QA1 is connected to receive voltage V1 provided by voltage source 120-1. The source node (S) of switch QA1 is coupled to the drain node (D) of switch QB1 as well as the input node of inductive path 1531. The source node of switch QB1 is coupled to ground. The output node of the inductive path 1531 is coupled to the load 118.

Yet further in this example embodiment, the drain node of switch QA2 of phase 222 is connected to receive voltage V1 provided by voltage source 120-1. The source node (S) of switch QA2 is coupled to the drain node (D) of switch QB2 as well as the input node of inductive path 1532 (inductor such as implemented via inductor device 110, inductor device 810, etc.). The source node of switch QB2 is coupled to ground. The output node of the inductive path 1532 is coupled to the load 118.

As previously discussed, the combination of the phases 221 and 222 produces the output voltage 123 that powers load 118. That is, the inductive path 1531 produces output voltage 123; inductive path 1532 produces output voltage 123.

During operation, as shown, controller 1540 produces control signals 105 (such as control signal A1 and control signal B1) to control states of respective switches QA1 and QB1. For example, the control signal A1 produced by the controller 1540 drives and controls the gate node of switch QA1; the control signal B1 produced by the controller 1540 drives and controls the gate node of switch QB1.

Additionally, controller 1540 produces control signals A2 and B2 to control states of switches QA2 and QB2. For example, the control signal A2 produced by the controller 1540 drives and controls the gate node of switch QA2; the control signal B2 produced by the controller 1540 drives and controls the gate node of switch QB2.

In one embodiment, the controller 1540 controls the phases 221 and 222 to be 180 degrees out of phase with respect to each other.

As is known with buck converters, in phase 221, activation of the high-side switch QA1 to an ON state while switch QB1 is deactivated (OFF) couples the input voltage V1 to the input of the inductive path 1531, causing an increase (such as ramped) in amount of current provided by the inductive path 1531 to the load 118. Conversely, activation of the low-side switch QB1 to an ON state while switch QA1 is deactivated (OFF) couples the ground reference voltage to the input of the inductive path 1531, causing a decrease (such as ramped) in amount of current provided by the inductive path 1531 to the load 118. The controller 1540 monitors a magnitude of the output voltage 123 and controls switches QA1 and QB1 such that the output voltage 123 stays within a desired voltage range.

Via phase 222, in a similar manner, activation of the high-side switch QA2 to an ON state while switch QB2 is deactivated (OFF) couples the input voltage V1 to the input of the inductive path 1532 causing an increase in amount of current provided by the inductive path 1532 to the load 118. Conversely, activation of the low-side switch QB2 to an ON state while switch QA2 is deactivated (OFF) couples the ground reference voltage to the input of the inductive path 1532, causing a decrease in amount of current provided by the inductive path 1532 to the load 118. The controller 1540 monitors a magnitude of the output voltage 123 and controls switches QA2 and QB2 such that the output voltage 123 stays within a desired voltage range.

Figure 16:
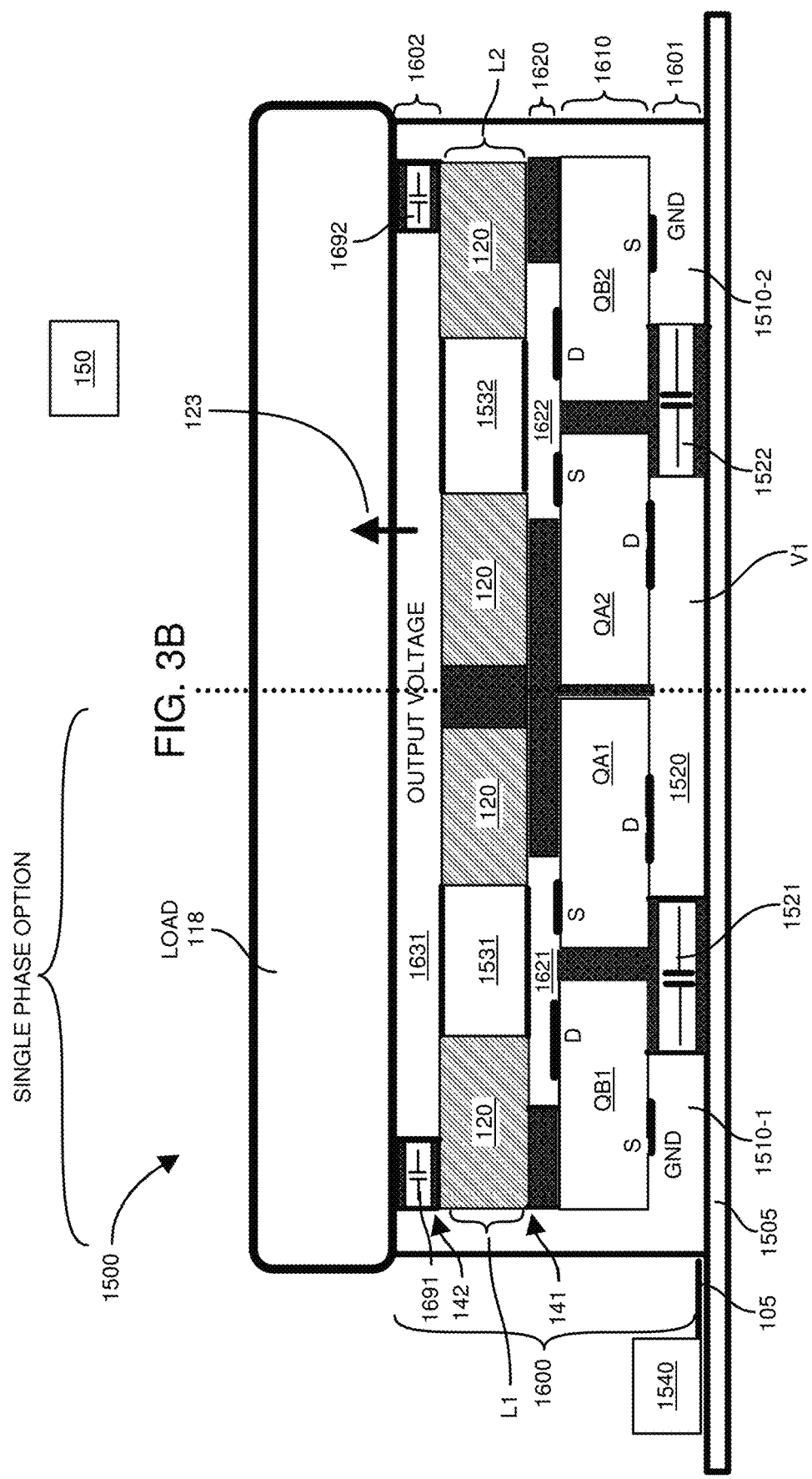
FIG. 16 is an example side view diagram illustrating a multi-phase power supply (in FIG. 15) and inductor devices supporting vertical power flow according to embodiments herein.

FIG. 16 is an example side view diagram illustrating the multi-phase power supply of FIG. 15 instantiated in a vertical stack according to embodiments herein.

The instantiation of power supply 1500 in this example embodiment supports vertical power flow. For example, the substrate 1505 and corresponding one or more power sources such as V1 supply power to the power supply stack assembly 1600, which in turn powers the dynamic load 118. Ground reference (GND) conveyed through the power supply stack assembly 1600 provides a reference voltage and return path for current conveyed through the stack to the load 118.

In one embodiment, the substrate 1505 is a circuit board (such as a standalone board, mother board, standalone board destined to be coupled to a mother board, etc.). The power supply stack assembly 1600 including one or more inductor devices is coupled to the substrate 1505. As previously discussed, the load 118 can be any suitable circuit such as CPUs (Central Processing Units), GPUs and ASICs (such those including one or more Artificial Intelligence Accelerators), which can be located on standalone circuit board.

Note that the inductive path 1531, 1532, etc., (instantiation of any of the inductor devices 110, 810, etc., as discussed herein) in the power supply stack assembly 1600 can be instantiated in any suitable manner as described herein. In this non-limiting example embodiment, the power supply stack assembly 1600 includes one or more instantiation of any the inductor devices 110, 810, etc., as discussed herein. Thus, power supply stack assembly 1600 can be configured to include any of the inductor devices as described herein.

Further in this example embodiment, the fabricator 150 fabricates power supply stack assembly 1600 (such as a DC-DC power converter) via stacking of multiple components including a first power interface 1601, one or more switches in switch layer 1610, connectivity layer 1620, one or more inductor assemblies (such as including one or more inductor devices), and a second power interface 1602.

The fabricator 150 further disposes the first power interface 1601 at a base of the stack (power supply assembly 1600 of components). The base of power supply stack assembly 1600 (such as power interface 1601) couples the power supply stack assembly 1600 to the substrate 1505.

In one embodiment, fabricator 150 disposes capacitors 1521 and 1522 in a layer of the power supply stack assembly 1600 including the power interface 1601.

Yet further, when fabricating the power supply stack assembly 1600, the fabricator 150 electrically couples multiple switches such as switch QA1, QB1, QA2, and QB2 in the power supply stack assembly 1600 to the first power interface 1601. The first power interface 1601 and corresponding connectivity to the substrate 1505 enables the switches QA1, QB1, QA2, and QB2 to receive power such as power input such as input voltage V1 and GND reference voltage from the substrate 1505. One or more traces, power layers, etc., on substrate 1505 provide or convey the voltages from voltage (or power) sources to the power interface 1601 of the power supply stack assembly 1600.

As previously discussed, controller 1540 generates control signals 105 to control respective switches QA1, QB1, QA2, and QB2 in the power supply stack assembly 1600 (see FIG. 15 for interconnectivity). Fabricator 150 provides connectivity between the controller 1540 and the switches QA1, QB1, QA2, and QB2 in any suitable manner to convey respective signals 105.

Atop the switches in the switch layer 1610, the fabricator 150 further fabricates the power supply stack assembly 1600 to include one or more inductor devices as described herein. Additionally, via connectivity layer 1620, the fabricator 150 further connects the switches QA1, QB1, QA2, and QB2 to the one or more inductor devices 1531, 1532, etc.

More specifically, in this example embodiment, the fabricator 150 connects the source node (S) of switch QB1 to the ground reference node 1510-1 in the power interface 1601. Note that the ground reference node 1510-1 (such as ground reference return path connected to the dynamic load 118) extends from the substrate 1505 to the dynamic load 118 via L-shaped ground node 1510-1 (which is connected to the ground voltage reference). The fabricator 150 connects the drain node (D) of switch QB1 to node 1621 (such as fabricated from metal), which is electrically connected to the first end 141 of the inductive path 1531 (such as instantiation of electrically conductive path 131, 831). Thus, via connectivity layer 1620, the fabricator 150 connects the drain node of the switch QB1 to the inductive path 1531.

The fabricator 150 connects the drain node (D) of switch QA1 to the voltage source node 1520 (which is electrically connected to the input voltage V1) of the first power interface 1601. The fabricator 150 connects the source node (S) of switch QA1 to node 1621, which is electrically connected to the first end 141 of the inductive path 1531 (such as instantiation of electrically conductive path 131 or electrically conductive path 831) as previously discussed. Thus, via connectivity layer 1620 and corresponding node 1621, the source node of the switch QA1 is connected to the inductive path 1531 of inductor device 110.

As further shown, the fabricator 150 connects the source node (S) of switch QB2 to the ground reference node 1510-2 in the power interface 1601. The ground reference node 1510-2 (current return path) extends from the substrate 1505 to the dynamic load 118 via L-shaped ground reference node 1510-2 (which is connected to the ground voltage reference). The fabricator 150 connects the drain node (D) of switch QB2 to node 1622 (such as fabricated from metal), which is electrically connected to the first end 141 of the inductive path 1532 (such as instantiation of electrically conductive path 131 or electrically conductive path 831). Thus, via connectivity layer 1620, the drain node of the switch QB2 is connected to the inductive path 1532 of inductor device 110.

Note that although each of the nodes 1510-1 and 1510-2 appear to be L-shaped from a side view of the power supply stack assembly 1600, in one embodiment, the node 1510 extends circumferentially about an outer surface of the power supply stack assembly 1600 (in a similar manner as electrically conductive path 133 as previously discussed).

As further shown, the fabricator 150 connects the drain node (D) of switch QA2 to the voltage source node 1520 (which is connected to voltage V1) in the power interface 1601. The fabricator 150 connects the source node (S) of switch QA2 to node 1622, which is electrically connected to the first axial end 141 of the inductive path 1532 (instantiation of electrically conductive path 131 or electrically conductive path 831). Thus, via connectivity layer 1620 and corresponding node 1622, the source node of the switch QA2 is connected to the inductive path 1532 (such as inductor device 110, inductor device 810, etc.).

Accordingly, the fabricator 150 disposes the one or more switches (such as QA1, QB1, QA2, and QB2) in the power supply stack assembly 1600 between the first power interface 1601 and the inductor device 110.

In one non-limiting example embodiment, each of the one or more switches QA1, QB1, QA2, and QB2 in the power supply stack assembly 1600 is a vertical field effect transistor disposed between the first power interface 1601 and the inductor devices. However, additionally, or alternatively, note that one or more of switches QA1, QB1, QA2, and QB2 can be any suitable type of switches such as vertical or lateral field effect transistors, bipolar junction transistors, etc. It is also possible for lateral FETs, but vertical FETs are the ideal choice for this concept due to the flip chip method to minimize the current loop.

As previously discussed, the fabricator 150 fabricates the power supply stack assembly 1600 to include one or more inductor devices. In this example embodiment, the fabricator 150 disposes the multiple inductive paths 1531 and inductive path 1532 in the power supply stack assembly 1600 between the multiple switches QA1, QB1, QA2, and QB2 and the second power interface 1602.

In accordance with further embodiments, note that fabrication of the multiple inductive paths 1531 and 1532 includes: fabricating the multiple inductive paths to include a first inductive path 1531 and a second inductive path 1532 extending through core material 120 of a respective inductor device 110 between the connectivity layer 1620 and the power interface 1602. In one embodiment, fabricator 150 fabricates each inductor device 1510 to include: i) core material 120, the core material being magnetically permeable ferromagnetic material, ii) an electrically conductive path extending through the core material 120 from a first axial end 141 of the inductor device 110 to a second axial end 142 of the inductor device 110.

Yet further in this example embodiment, the first inductive path 1531 is disposed in a first phase 221 (FIG. 15) of the power supply stack assembly 1600 (power converter circuit); the second inductive path 1532 is disposed in a second phase 222 (FIG. 15) of the power supply stack assembly 1600 (power converter circuit). During operation of the power converter (power supply stack assembly 1600), a combination of the first phase 221 and the second phase 222 disposed in parallel produce the output voltage 123. If desired, the controller 1540 can be fabricated into the power supply stack assembly 1600 as well.

In one embodiment, each of the one or more inductive paths 1531 and 1532 is a respective non-winding path extending from a first layer (such as switch layer 1610) in the stack including the multiple switches QA1, QB1, QA2, and QB2 to a second layer in the stack including the second power interface 1602.

Note that further embodiments herein include connecting multiple inductive paths in the inductor devices 1510 in parallel to increase an inductance of a respective inductive path. As described herein, any number of inductive paths can be connected in parallel to provide a desired overall inductance. Thus, in addition to controlling parameters such as permeability of the core material 120 of a respective inductor device, a respective length (between first end 141 and second end 142) of each non-winding electrically conductive path (such as straight or direct path) in the inductor device 110, embodiments herein also include connecting multiple inductive paths in parallel to control a magnitude of inductance provided by the respective inductor device 110. Also, as previously discussed, embodiments herein include fabricating the core material 120 in the inductor devices such that a magnitude of the magnetic permeability of the core material varies with respect to a respective electrically conductive path providing connectivity between layer 1620 and 1602.

As further shown, the fabricator 150 disposes the inductor devices in the power supply stack assembly 1500 between the multiple switches QA1, QB1, QA2 and QB2) in switch layer 1610 and the second power interface 1602.

More specifically, the fabricator 150 produces the power supply assembly 1600 to include a second power interface 1602. In one embodiment, the fabricator 150 connects the output axial end of the inductor device (L1 and L2) and corresponding nodes to the second power interface 1602. The second power interface 1602 is operable to receive the output voltage 123 produced by the inductor devices L1 and L2 and output it to the load 118. The fabricator 150 couples the output nodes of both the inductive path 1531 and inductive path 1532 to the output voltage node 1631 (such as a layer of material such as metal). Thus, the output voltage node 1631 is electrically connected to the output of the respective inductive paths 1531 and 1532.

As its name suggests, the output voltage node 1631 conveys the output voltage 123 to power the load 118.

In one embodiment, one or more nodes or pins, pads, etc., of the dynamic load 118 are coupled to the output voltage node 1631. For example, output voltage node 1631 of the power supply stack assembly 1500 conveys the output voltage 123 produced by each of the inductive paths 1531 and 1532 to the one or more nodes, pins, pads, etc., of the load 118.

Accordingly, via switching of the inductive paths between the ground voltage and the input voltage V1, the combination of inductive paths 1531 and 1532 collectively produces the output voltage 123 to power the load 118.

As previously discussed, power supply stack assembly 1600 further includes ground node 1510-1 and 1510-2. In one embodiment, the instantiation of electrically conductive path 1510-1 and 1510-2 (such as ground nodes) provide perimeter electromagnetic shielding with respect to power supply stack assembly 1600, preventing or reducing corresponding radiated emissions into the surrounding environment.

In yet further embodiments, the fabricator 150 fabricates the first power interface 1601 to include first contact elements operable to connect the first power interface 1601 at the base of the power supply stack assembly 1600 to a host substrate 1505. The fabricator 150 fabricates the second power interface 1602 to include second contact elements operable to affix a dynamic load 118 to the power supply stack assembly 1600.

Note that power supply stack assembly 1500 is fabricated to further include first capacitors 1521, 1522, etc., providing connectivity between the input voltage node 1520 (first electrically conductive path supplying input voltage V1 to the power supply stack assembly 1600) and ground nodes 1510-1 and 1510-2 (such as second electrically conductive path supplying the ground reference voltage to the power supply stack assembly 1600).

The fabricator 150 further disposes output voltage node 1631 (such as another electrically conductive path) in the layer of the power supply stack assembly 1602 including the second power interface 1602. As previously discussed, the output voltage node 1631 (such as layer of metal) is operable to convey the output voltage 123 to the dynamic load 118.

In accordance with further embodiments, the fabricator 150 fabricates the power supply stack assembly 1600 to include second capacitors (1691, 1692, etc.) connected between the output voltage node 1631 and a respective ground node 1510. More specifically, capacitor 1691 is coupled between output voltage node 1631 and the ground node 1510-1; capacitor 1692 is coupled between output voltage node 1631 and the ground node 1510-2.

Further embodiments herein include affixing a dynamic load 118 to the second power interface 1602. Accordingly, the dynamic load 118 is affixed atop the power supply stack assembly 1600.

The power supply stack assembly 1600 (assembly of components such as a vertical stack) as described herein provides advantages over conventional power converters. For example, the power supply stack assembly 1600 as described herein provides novel connectivity of components in an assembly (such as via stacking), resulting in shorter circuit paths and lower losses when converting and delivering power to the dynamic load 118.

As previously discussed with respect to FIG. 15, during operation, the inductor devices L1 and L2 and corresponding inductive paths 1531 and 1532 are operable to produce an output voltage 123 based on the received power (current supplied by input voltage, V1). In other words, the power supply stack assembly 1600 and corresponding fabricated stack of components (such as first power interface 1601, one or more switches QA1, QB1, QA2, and QB2, inductor device 110 second power interface 1602) is a power converter operable to convert an input voltage V1 (such as a DC voltage) received at the first power interface 1601 into the output voltage 123 (such as a DC voltage) outputted from the second power interface 1602 to the dynamic load 118.

Further embodiments herein include fabrication of the system. For example, embodiments herein include a fabricator 150. The fabricator 150 receives a substrate 1505 such as a circuit board; the fabricator 150 affixes a base (such as interface 1601) of the stack of components (such as a power supply stack assembly 1600) to the circuit board. As previously discussed, the stack of components (power supply stack assembly 1600) is operative to generate an output voltage 123 to power a load 118. The load 118 is either affixed to the circuit board or the load 118 is affixed atop the power supply stack assembly 1600.

Further, as previously discussed, the load 118 can be any suitable circuit such as CPUs (Central Processing Units), GPUs and ASICs (such those including one or more Artificial Intelligence Accelerators), which can be located on standalone circuit board.

Figure 17:
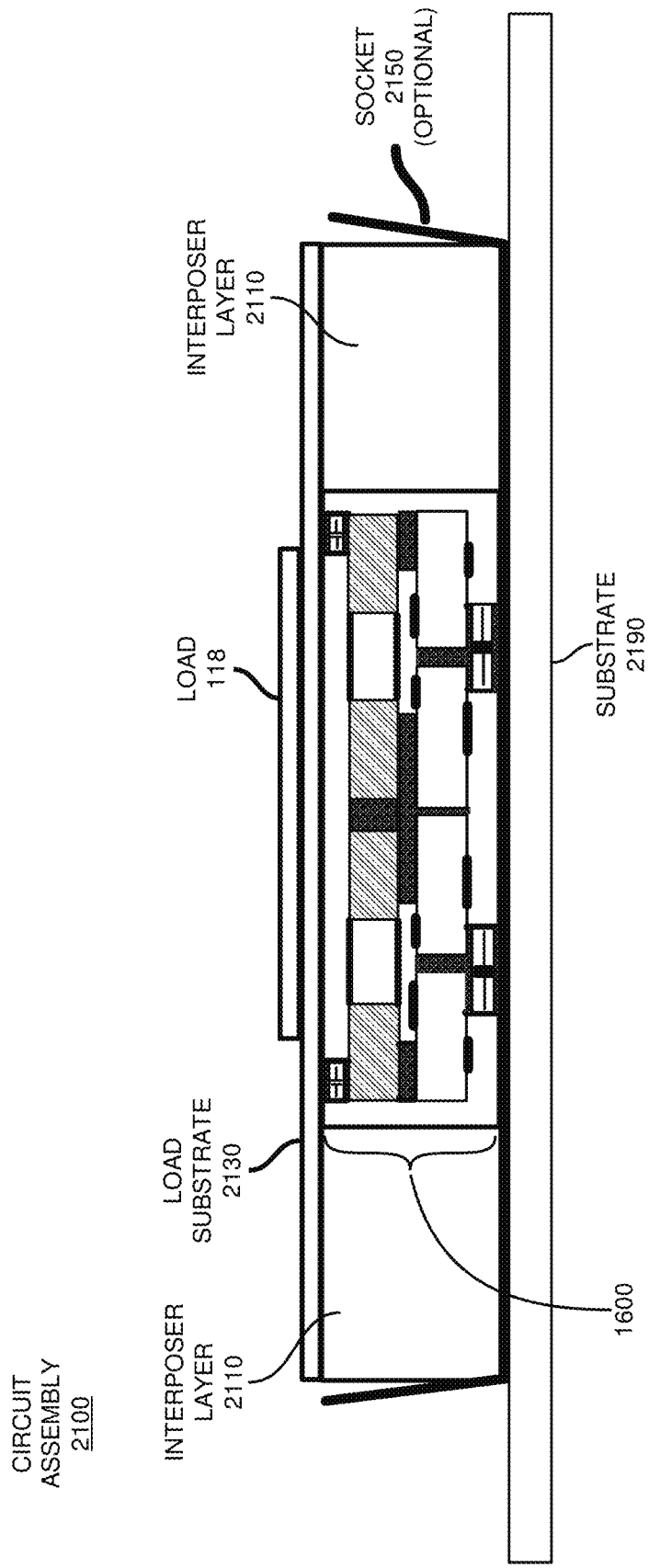
FIG. 17 is an example diagram illustrating a power supply circuit assembly including one or more inductor devices according to embodiments herein.

FIG. 17 is an example diagram illustrating a circuit assembly according to embodiments herein.

As shown in this example embodiment, circuit assembly 2100 includes power supply stack assembly 1600 disposed in an interposer layer 2110. The interposer layer 2110 provides circuit path connectivity between the substrate 2190 and the load substrate 2130 (and load 118).

In a manner as previously discussed, the power supply stack assembly (1600) receives an input voltage (and any other voltage reference signals such as ground, and/or V1, V2, etc.) from the substrate 2190. The power supply stack assembly (1600) converts the input voltage into an output voltage 123 (and/or output current) that powers the respective load 118 and/or other circuit components disposed on the load substrate 2130.

In one embodiment, the substrate 2190 is a Printed Circuit Board (PCB) substrate, although substrate 2190 can be any suitable component to which socket 2150 (optional) or interposer layer 2110 is connected. Via insertion into socket 2150, the interposer layer 2110 is in communication with the substrate 2190. In the absence of socket 2150, the interposer layer 2110 is connected directly to the substrate 2190.

Figure 18:
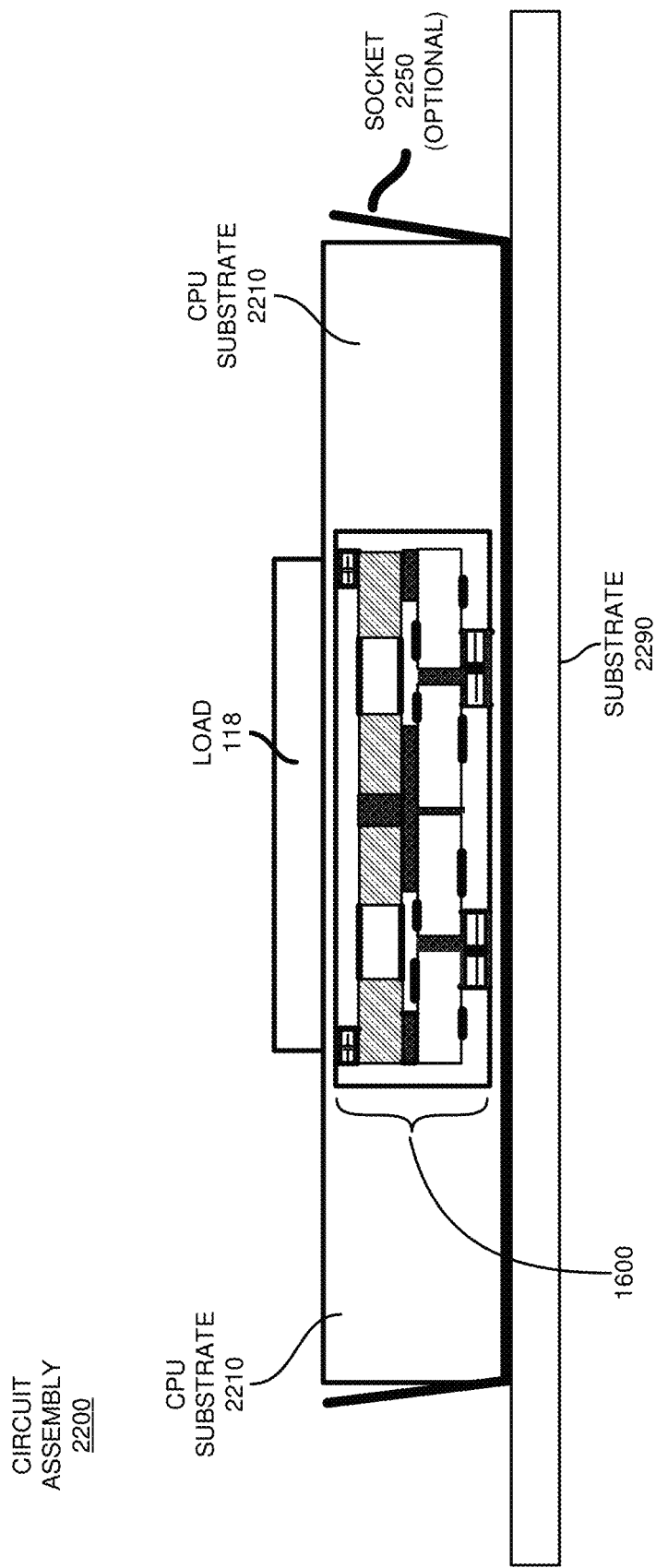
FIG. 18 is an example diagram illustrating a power supply circuit assembly including one or more inductor devices according to embodiments herein.

FIG. 18 is an example diagram illustrating a circuit assembly according to embodiments herein.

As shown in this example embodiment, circuit assembly 2200 includes power supply stack assembly 1600 disposed in a CPU (Central Processing Unit) substrate 2210. In one embodiment, the power supply stack assembly is integrated into the laminate portion of the CPU substrate 2210 itself. The CPU substrate 2210 provides circuit path connectivity between the substrate 2290 and the load 118 (and other components connected to the CPU substrate load 2120).

In a manner as previously discussed, the power supply stack assembly (1600) receives an input voltage (and any other voltage reference signals such as ground, and/or voltages V1, V2, etc.) from the substrate 2290. The power supply stack assembly (1600) converts the input voltage into an output voltage (and/or output current) that powers the respective load 118 and/or other circuit components disposed on the load CPU substrate 2210.

In one embodiment, the substrate 2290 is a Printed Circuit Board (PCB) substrate, although substrate 2290 can be any suitable component to which socket 2250 (optional) or CPU substrate 2210 is directly connected. Via insertion into socket 2250, the CPU substrate layer 2210 and power supply stack assembly is in communication with the substrate 2290. In the absence of socket 2250, the CPU substrate 2210 is connected directly to the substrate 2290.

Figure 19:
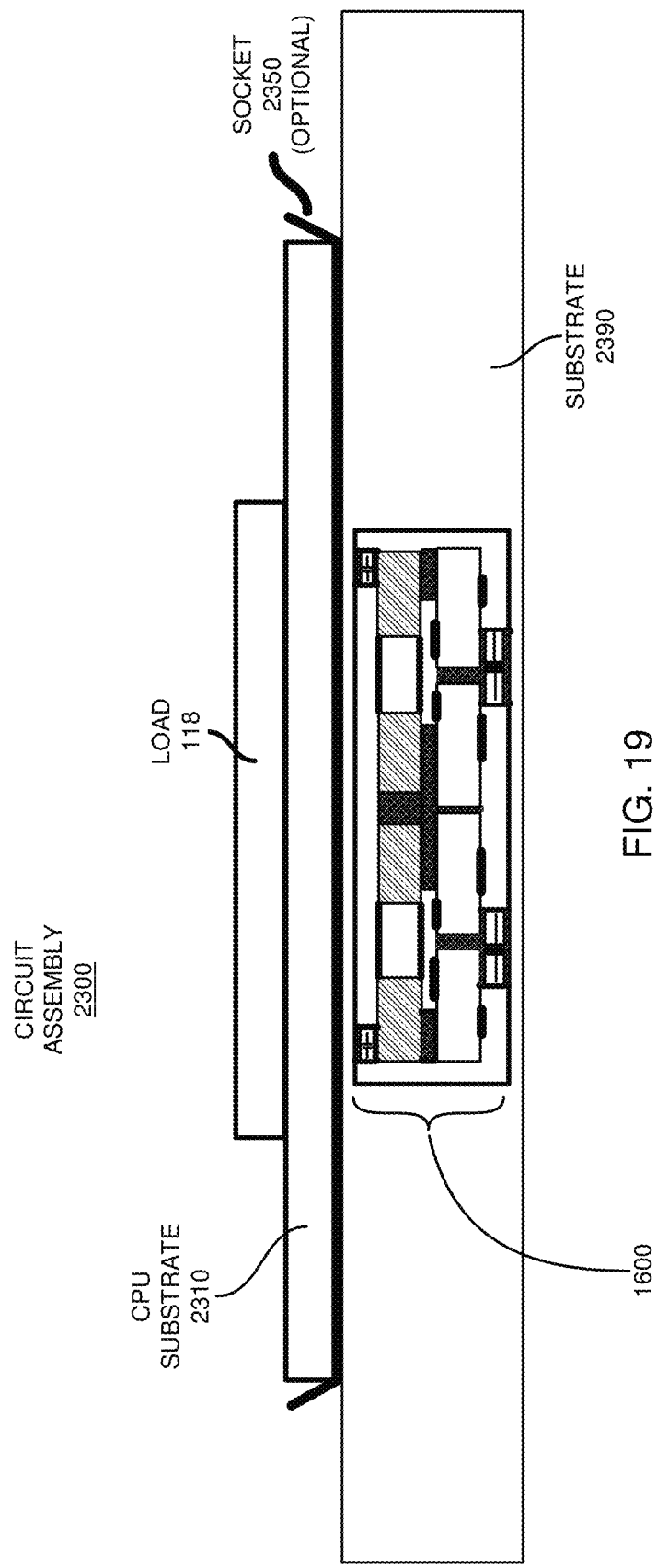
FIG. 19 is an example diagram illustrating a power supply circuit assembly including one or more inductor devices according to embodiments herein.

FIG. 19 is an example diagram illustrating a circuit assembly according to embodiments herein.

As shown in this example embodiment, circuit assembly 2300 includes power supply stack assembly 1600 disposed in substrate 2390 such as a circuit board (such as a printed circuit board).

In one embodiment, the power supply stack assembly 1600 is embedded or fabricated in an opening of the substrate 2390. In other words, in one embodiment, the power supply stack assembly 1600 (converter unit) is fabricated (inserted) into an opening below the CPU substrate 2310. The CPU substrate 2310 provides circuit path connectivity between the substrate 2390 and the load 2320 (and/or other components connected to the CPU substrate load 2310).

In a manner as previously discussed, the power supply stack assembly (1600) receives an input voltage (and any other voltage reference signals such as ground, and/or V1, V2, etc.) from the substrate 2390. The power supply stack assembly (1600) converts the input voltage into an output voltage (and/or output current) that powers the respective load 2320 and/or other circuit components disposed on the load CPU substrate 2310.

In one embodiment, the substrate 2390 is a Printed Circuit Board (PCB) substrate, although substrate 2390 can be any suitable component to which socket 2350 (optional) or CPU substrate 2310 is directly connected. In one embodiment, via insertion into socket 2350, the CPU substrate 2310 is in communication with the substrate 2390. In the absence of socket 2350, the CPU substrate 2310 is connected directly to the substrate 2390.

Figure 20:
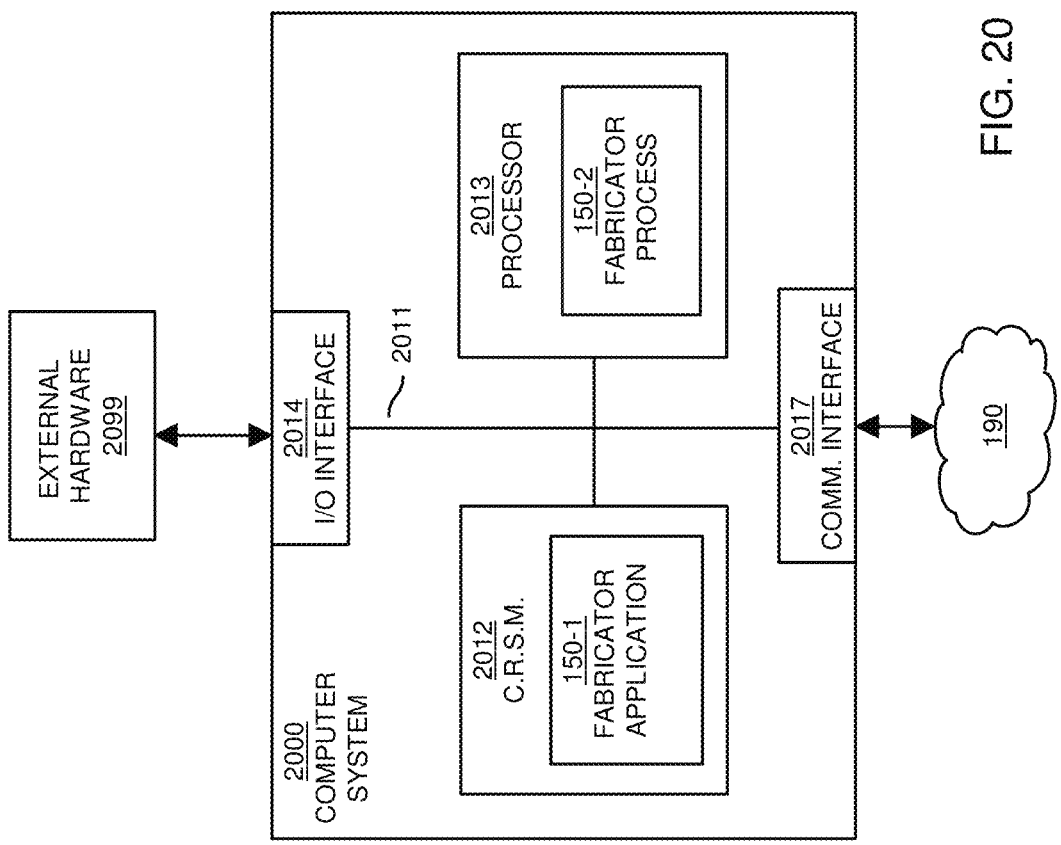
FIG. 20 is an example diagram illustrating example computer architecture (fabricator system, hardware, etc.) operable to execute one or more methods according to embodiments herein.

FIG. 20 is a diagram illustrating example computer architecture operable to execute one or more methods according to embodiments herein.

As previously discussed, any of the resources (such as fabricator 150, etc.) as discussed herein can be configured to include computer processor hardware and/or corresponding executable instructions to carry out the different operations as discussed herein.

As shown, computer system 2000 of the present example includes an interconnect 2011 that couples computer readable storage media 2012 such as a non-transitory type of media (which can be any suitable type of hardware storage medium in which digital information can be stored and retrieved), a processor 2013 (computer processor hardware), I/O interface 2014, and a communications interface 2017.

I/O interface(s) 2014 supports connectivity to external hardware 2099 such as a keyboard, display screen, repository, fabrication equipment, etc.

Computer readable storage medium 2012 can be any hardware storage device such as memory, optical storage, hard drive, floppy disk, etc. In one embodiment, the computer readable storage medium 2012 stores instructions and/or data.

As shown, computer readable storage media 2012 can be encoded with fabricator application 150-1 (e.g., including instructions) to carry out any of the operations as discussed herein.

During operation of one embodiment, processor 2013 accesses computer readable storage media 2012 via the use of interconnect 2011 in order to launch, run, execute, interpret or otherwise perform the instructions in fabricator application 150-1 stored on computer readable storage medium 2012. Execution of the fabricator application 150-1 produces fabricator process 150-2 to carry out any of the operations and/or processes as discussed herein.

Those skilled in the art will understand that the computer system 2000 can include other processes and/or software and hardware components, such as an operating system that controls allocation and use of hardware resources to execute fabricator application 150-1.

In accordance with different embodiments, note that computer system may reside in any of various types of devices, including, but not limited to, a power supply, switched-capacitor converter, power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 2000 may reside at any location or can be included in any suitable resource in any network environment to implement functionality as discussed herein.

Functionality supported by one or more resources as described herein are discussed via flowchart in FIG. 21. Note that the steps in the flowcharts below can be executed in any suitable order.

FIG. 21 is a flowchart 2107 illustrating an example method according to embodiments herein. Note that there will be some overlap with respect to concepts as discussed above.

In processing operation 2117, the fabricator 150 receives magnetically permeable material.

In processing operation 2127, the fabricator 150 fabricates an inductor device (110, 810) to include an electrically conductive path (131, 831) and the magnetically permeable material, the electrically conductive path extending through the core from a first end of the inductor device to a second end of the inductor device.

In processing operation 2137, via fabricator 150 the core 120 of the inductor device (110, 810) is fabricated to have a magnetic permeability that varies depending on a radial distance outward with respect to the electrically conductive path (131, 831).

Note again that techniques herein are well suited for use in fabrication of inductor devices and corresponding implementation in power converter applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An inductor device comprising:
a core fabricated from magnetically permeable material, the core including an inner diameter and an outer diameter, the magnetically permeable material disposed between the inner diameter and the outer diameter;
an electrically conductive path disposed within the inner diameter of the core, an outer diameter of the electrically conductive path extending to the inner diameter of the core;
a magnetic permeability of the core varying in magnitude depending on a distance with respect to the electrically conductive path;
wherein the core includes multiple concentric layers of magnetically permeable material disposed about the electrically conductive path;
wherein the multiple concentric layers of magnetically permeable material include a first concentric layer of magnetically permeable material and a second concentric layer of magnetically permeable material;
wherein the first concentric layer of magnetically permeable material extends between the outer diameter of the electrically conductive path to an inner diameter of the second magnetically permeable material; and
wherein a portion of the second concentric layer of magnetically permeable material disposed near the inner diameter of the second concentric layer of magnetically permeable material is operative to support a first magnetic flux density, the first magnetic flux density being greater than 50 percent of a second magnetic flux density supported by a portion of the first concentric layer of magnetically permeable material disposed near an inner diameter of the first concentric layer of magnetically permeable material.

2. The inductor device as in claim 1, wherein the magnetic permeability of the core varies as a function of a radial distance from the electrically conductive path.

3. The inductor device as in claim 2, wherein the magnetic permeability of the core increases in magnitude as the radial distance from the electrically conductive path increases.

4. The inductor device as in claim 1, wherein the core includes multiple concentric layers of material with respect to the electrically conductive path.

5. The inductor device as in claim 1, wherein the core is operative to confine magnetic flux generated from current flowing through the electrically conductive path.

6. The inductor device as in claim 1, wherein a magnitude of the magnetic permeability of the magnetically permeable material is between 30 and 150 Henries/meter.

7. The inductor device as in claim 1, wherein a change in the magnetic permeability in the core as a function of the distance from the electrically conductive path is substantially linear.

8. The inductor device as in claim 1, wherein a change in the magnetic permeability in the core from the inner diameter of the core to an outer diameter of the core is linear.

9. The inductor device as in claim 8, wherein the change is stepwise linear in accordance with a stepwise linear function, each step in the stepwise linear function corresponding to a different magnitude of a respective magnetically permeable material layer between the inner diameter of the core to the outer diameter of the core.

10. The inductor device as in claim 8, wherein the change is a continuous linear gradient in accordance with a linear function.

11. The inductor device as in claim 1, wherein the electrically conductive path is a first electrically conductive path.

12. The inductor device as in claim 11, wherein the second concentric layer of magnetically permeable material has a higher magnitude of magnetic permeability than the first concentric layer of magnetically permeable material.

13. The inductor device as in claim 12 further comprising:
   a second electrically conductive path encompassing the core of magnetically permeable material.

14. The inductor device as in claim 13, wherein the second electrically conductive path is disposed circumferentially as a layer of material disposed at the outer diameter of the core.

* * * * *